United States Patent [19]
Dulman

[11] Patent Number: 6,018,567
[45] Date of Patent: Jan. 25, 2000

[54] MAINTENANCE OPERATIONS CONSOLE FOR AN ADVANCED INTELLIGENT NETWORK

[75] Inventor: Scott P. Dulman, Arlington, Va.

[73] Assignee: Bell Atlantic Network Services, Inc., Arlington, Va.

[21] Appl. No.: 09/031,043

[22] Filed: Feb. 26, 1998

Related U.S. Application Data

[63] Continuation of application No. 08/562,330, Nov. 22, 1995, Pat. No. 5,802,146.

[51] Int. Cl.[7] ................................................ H04M 1/24
[52] U.S. Cl. ............................... 379/34; 379/10; 379/15; 379/27; 379/120
[58] Field of Search .............................. 379/34–35, 10, 379/15, 27, 120, 1, 12, 22–23, 29, 32, 134–135, 111–115, 201, 207, 127, 133

[56] References Cited

U.S. PATENT DOCUMENTS

| | | |
|---|---|---|
| 4,464,543 | 8/1984 | Kline et al. . |
| 4,704,724 | 11/1987 | Krishnan et al. . |
| 5,018,184 | 5/1991 | Abrams et al. . |
| 5,195,085 | 3/1993 | Bertsch et al. . |
| 5,212,727 | 5/1993 | Ramkumar . |
| 5,241,588 | 8/1993 | Babson, III et al. . |
| 5,247,571 | 9/1993 | Kay . |
| 5,309,437 | 5/1994 | Perlman et al. . |
| 5,386,467 | 1/1995 | Ahmad . |
| 5,392,328 | 2/1995 | Schmidt et al. . |
| 5,402,483 | 3/1995 | Weinberger . |
| 5,425,090 | 6/1995 | Orriss . |
| 5,426,688 | 6/1995 | Anand ......................................... 379/5 |
| 5,432,932 | 7/1995 | Chen et al. .............................. 709/103 |
| 5,448,632 | 9/1995 | Iyob et al. . |
| 5,469,500 | 11/1995 | Satter et al. . |
| 5,475,732 | 12/1995 | Pester, III ................................. 379/34 |
| 5,563,930 | 10/1996 | Pester, III .................................... 379/1 |
| 5,572,583 | 11/1996 | Wheeler, Jr. et al. . |
| 5,708,772 | 1/1998 | Zeldin et al. . |
| 5,790,634 | 8/1998 | Kinser et al. ............................. 379/29 |
| 5,802,146 | 9/1998 | Dulman ..................................... 379/34 |

*Primary Examiner*—Curtis A. Kuntz
*Assistant Examiner*—Duc Nguyen
*Attorney, Agent, or Firm*—McDermott, Will & Emery

[57] ABSTRACT

An arrangement for monitoring operations of advanced intelligent network (AIN) elements of a public switched telephone network by transporting standardized network management messages across a data network. A maintenance and operations console (MOC) sends and receives Simplified Network Management Protocol (SNMP) objects from AIN elements such as an Intelligent Peripheral (IP) via a packet switched network using a standardized transport protocol such as TCP/IP. The IP includes an error monitoring system that collects error messages and generates an error status report. An SNMP agent internal to the IP converts the error status report to SNMP objects outputs the SNMP objects onto the packet switched network. The MOC receives the SNMP objects, assigns an operational priority to the SNMP objects, and displays the operational priority of the received SNMP objects based on object relationships identified by a Management Information Base (MIB). The MOC outputs SNMP objects identifying corrective measures in accordance with user selection inputs and the object relationships identified by the MIB. The MOC of the present invention provides flexible monitoring of AIN elements at different locations based on the use of SNMP object base, and accommodates changes to the AIN based on the received MIB objects.

4 Claims, 14 Drawing Sheets

| OSI Layer | SNMP - Related Function | DARPA Layer |
|---|---|---|
| Application | Management Application (SNMP PDU) | Process / Application |
| Presentation | Structure of Management Information (ASN.1 & BER Encoding) | |
| Session | Authentication (SNMP Header) | |
| Transport | User Datagram Protocol (UDP) | Host-to-Host |
| Network | Internet Protocol (IP) | Internet |
| Data Link / Physical | LAN or WAN Interface Protocol | Network Interface |

Figure 8

| MOC | ip2 | | | | |
|---|---|---|---|---|---|
| Appl | All | Critical | Major | Minor | Info |
| All | 4 | 2 | 2 | 0 | 0 |
| OS Errors | 1 | 1 | 0 | 0 | 0 |
| Monitor | 1 | 0 | 1 | 0 | 0 |
| IVR | 2 | 1 | 1 | 0 | 0 |
| Middleware | 0 | 0 | 0 | 0 | 0 |
| DSP | 0 | 0 | 0 | 0 | 0 |
| Quit | | | | | Help |

Figure 9J

MAINTENANCE OPERATIONS CONSOLE FOR AN ADVANCED INTELLIGENT NETWORK

This application is a continuation of Ser. No. 08/562,330 filed Nov. 22, 1995 now U.S. Pat. No. 5,802,146.

BACKGROUND OF THE INVENTION

1. Technical Field

The present invention relates to an Advanced Intelligent Network having a network node, referred to as a Maintenance Operations Console (MOC), that monitors and controls operations of the elements of the Advanced Intelligent Network.

2. Description of the Related Art

In recent years, a number of new service features have been provided by an enhanced public communications telephone network, referred to as an Advanced Intelligent Network (AIN). In an AIN type system, local and/or toll offices of the public telephone network detect one of a number of call processing events identified as AIN "triggers". For ordinary telephone service calls, there would be no event to trigger AIN processing, and the local and toll office switches would function normally and process such calls without referring to the central database for instructions. An office which detects a trigger will suspend call processing, compile a call data message and forward that message via a common channel interoffice signaling (CCIS) link to an Integrated Service Control Point (ISCP) which includes a Multi-Services Application Platform (MSAP) database. If needed, the ISCP can instruct the central office to obtain and forward additional information. Once sufficient information about the call has reached the ISCP, the ISCP accesses its stored data tables in the MSAP database to translate the received message data into a call control message and returns the call control message to the office of the network via CCIS link. The network offices then use the call control message to complete the particular call. An AIN type network for providing an Area Wide Centrex service was disclosed and described in detail in commonly assigned U.S. Pat. No. 5,247,571 to Kay et al., the disclosure of which is herein incorporated in its entirety by reference. In AIN type systems such as disclosed in Kay et al., announcement and digit functions may be required for certain specific services. For example, a caller may be prompted by a tone or speech announcement to enter a personal identification number (PIN) before obtaining a selected service or modifying certain stored parameters relating to the subscriber's AIN service. In prior art AIN systems, a switching office of the public telephone network would generate the announcements from some internal platform.

Intelligent Peripherals (IPs) have been proposed as an AIN network node that provides a platform to provide readily adaptable means to add and change announcements to an AIN, without direct addition of equipment in each central office switching system. By centralizing announcement capabilities in the IP, announcement changes can be performed without reprogramming every switch in the network offering an enhanced service. The IP also provides a flexible platform to accommodate the addition of future service enhancements, such as speech recognition, mail services, etc., without requiring addition to or modification of equipment within the central office switching systems.

Telephone networks have historically required a high level of reliability in the services provided to its subscribers. Accordingly, it is highly desirable that the enhanced service features provided by AIN networks have the same high level of reliability as conventional public switched telephone networks. Thus, AIN elements have been equipped with dedicated maintenance and operations consoles (MOCs) to monitor operations of the respective AIN element. For example, Bellcore has developed an ISCP that has a dedicated maintenance and operations console (MOC) for monitoring the operations of the ISCP. Each Bellcore ISCP is mated with a dedicated Bellcore provisioning system, known as the SPACE provisioning system, that also has its own dedicated MOC. The SPACE provisioning system programs the databases in the specific ISCP, for example by communicating via a packet switched network, such as Transmission Control Protocol/Internet Protocol (TCP/IP) network. A more detailed description of an exemplary implementation of the SPACE provisioning system 54 is found in U.S. Pat. No. 5,241,588 to Babson, III et al., the disclosure of which is incorporated in its entirety by reference.

A protocol known as Simplified Network Management Protocol (SNMP) has been specified for the communication of management information in data networks using TCP/IP protocol. This protocol is designed to be simple but flexible so that management applications of some complexity can be built, while still retaining support for the lowest common denominator of managed systems.

However, the maintenance and operations systems in the telephone networks have not adopted SNMP due to the perceived inability of SNMP to accommodate the relative complexity of the telephone network functions. Moreover, existing MOCs such as the Bellcore ISCP MOC and SPACE MOC use proprietary software and technology that is incompatible with SNMP. The incompatibility of the ISCP MOC and the SPACE MOC with SNMP prevents the transport of management information from the ISCP MOC or the SPACE MOC to another AIN element via the TCP/IP network.

Hence, each AIN element requires its own dedicated MOC, often at the physical location of that AIN element. Thus, the addition of another AIN element, such as an IP, will require the addition of a dedicated MOC to ensure reliability of the new AIN element. For example, commonly-assigned, copending application No. 08/248,980, filed May 25, 1994, entitled Advanced Intelligent Network with Intelligent Peripherals Interfaced to the Integrated Services Control Point (attorney No. 680-076), the disclosure of which is incorporated in its entirety by reference, discloses an IP that has its own dedicated MOC. Thus, MOCs are unable to communicate with each other in order to share resources or compare different errors from different AIN elements, thereby complicating efforts to identify faults in AIN systems failures.

DISCLOSURE OF THE INVENTION

There is a need for a Maintenance Operations Console (MOC) that can perform management functions for any network element in a public communications network.

There is also a need for a MOC that can be located separate from a managed programmable node of the public communications network.

There is also a need for a MOC which is able to monitor hardware, software, and software subsystems of a programmable node of a public communications network via a data network.

There is also a need for a MOC that monitors and detects errors in hardware, software, and software subsystems of an Advanced Intelligent Network (AIN) element by receiving SNMP protocol messages from the AIN element via a packet switched network having TCP/IP protocol.

There is also a need for a MOC that uses a data network to monitor errors in the program-controlled nodes of the public communications network, and to output corrective measures to eliminate the detected errors.

These and other needs are met by the present invention, whereby a network maintenance and operations console (MOC) sends and receives messages in a standardized network management message format to and from a data network using a standardized transport protocol, such as TCP/IP. A public communications network has a plurality of program-controlled nodes that are connected to the data network and output error status messages for maintenance, error detection and failure recovery operations of software and hardware subsystems. Each program-controlled node includes a monitoring subsystem and a communications subsystem. The monitoring subsystem identifies errors in the hardware and software subsystems of the corresponding program-controlled node and supplies the status of the identified error to a communications subsystem, which outputs the status of the identified error onto the data network as objects of a standardized network management message format.

The network maintenance and operations console receives the objects output from the respective program-controlled node, assigns operational priorities to the received objects based on identified object relationships stored in a management information base (MIB), and presents the status of the identified errors on a graphical user interface in accordance with a relational hierarchy of the received objects with respect to the program-controlled nodes elements and the respective operational priorities.

Thus, the maintenance and operations console of the present invention uses a standardized network management message format and a standardized transport protocol to receive management information from any program-controlled node connected to the data network. Hence, the network maintenance and operations console of the present invention is able to monitor a number of different network nodes from virtually any location, and can locally and remotely monitor, administer, and troubleshoot any problems that may be present in an program-controlled node, including software subsystems of the program-controlled node.

The present invention also provides a system for performing corrective action on detected errors within software subsystems of the program-controlled nodes, also referred to as public communications network elements connected, to the data network using a standardized network management protocol. According to the present invention, the maintenance operations console comprises an error correction module that outputs to the data network an SNMP object that represents a correction message for one of the AIN elements. The correction message can be used to perform disaster recovery techniques, such as aborting and restarting a software module, resetting the software module, or loading new software into the software module. Alternatively, the correction message may be sent to a different network element that manages network assignments in order to perform fail-over, i.e., reassigning network resources to compensate for the failed subsystem of an AIN element.

Thus, the present invention provides a generic system for monitoring any AIN network element using a standardized network management message format and a data network having a standardized transport protocol. In addition, the maintenance operations console of the present invention is able to easily accommodate newly added AIN elements that are installed on the advanced intelligent network. Thus, the present invention provides the flexibility to manage a large number of AIN elements from a remote location, and initiate corrective measures as necessary, without the necessity for dedicated consoles that use proprietary technology.

These and other advantages of the present invention will become more readily apparent upon a review of the attached drawings and the accompanying description and the appended claims.

BRIEF DESCRIPTION OF DRAWINGS

FIG. 8 is a protocol diagram of the Simplified Network Management Protocol.

FIGS. 9A–9J are diagrams illustrating a graphic user interface for the MOC of FIGS. 2, 3 and 4.

BEST MODE FOR CARRYING OUT THE INVENTION

The present invention provides a system for managing the maintenance and operations of a program-controlled node of a public communications network by outputting from each node error status messages that identify the operational status of the node hardware and software subsystems. The error status messages are output as objects of a standardized network management message format, such as Simplified Network Management Protocol (SNMP), to a Maintenance and Operations Console (MOC) via a data network using a standardized transport protocol, such as TCP/IP. The MOC includes a Management Information Base (MIB) that identifies the received objects, a mapping module that determines the priority of the node performance based on the received MIB objects, a topology module for organizing the MIB objects for presentation on a graphic user interface (GUI), and a corrective action module that outputs objects using the standardized network management message format, such as SNMP, to at least one program-controlled node to respond to a detected error. An overview of the public communications network will first be provided, followed by a detailed description of the preferred embodiment of the MOC of the present invention.

Figure 1:
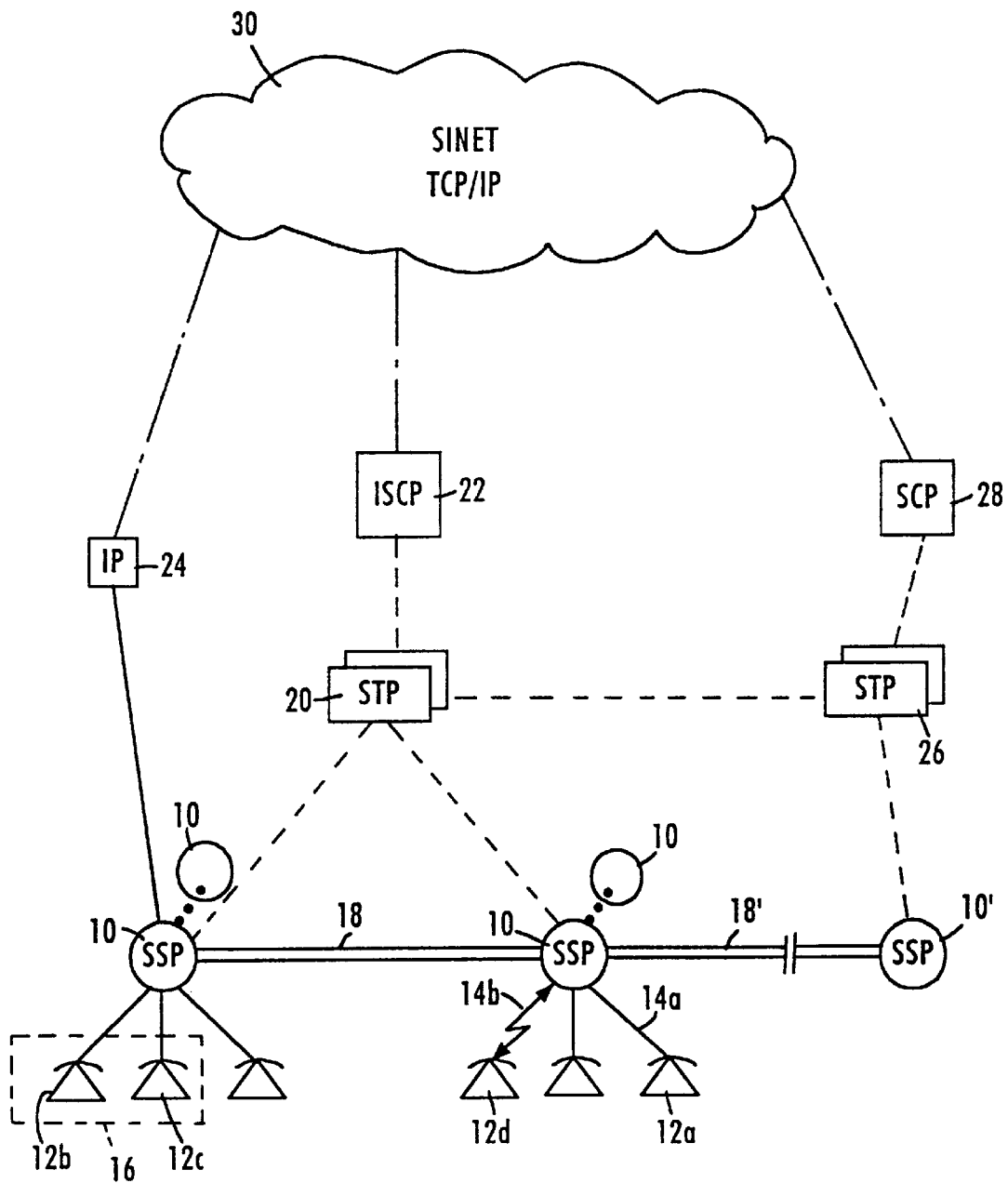
FIG. 1 is a block diagram of an exemplary Advanced Intelligent Network architecture for a public switched telephone communications network.

FIG. 1 provides a simplified block diagram of a public telephone type communications network having program-controlled nodes to provide advanced service capabilities. The network shown in FIG. 1 resembles the type shown in U.S. Pat. No. 5,247,571 to Kay et al., the disclosure of which is incorporated in its entirety by reference, and is thus also referred to as an Advanced Intelligent Network (AIN), wherein the program-controlled nodes are also referred to as "AIN nodes" or "AIN elements". The telephone network of FIG. 1 includes a switched traffic network and a common channel signaling network used to carry control signaling and the like between nodes of the switched traffic network.

The network of FIG. 1 includes a number of end office switching systems 10, also referred to as service switching points (SSPs) for reasons discussed later. The switching systems 10 provide connections to and from local communication lines coupled to end users equipment. Although the end users equipment may consist of telephone station sets 12a connected to POTS or ISDN lines 14a, the end users equipment may be arranged as customer premises equipment 16 serving users 12b and 12c. In addition, an end user 12d may have a wireless link 14b to the SSP 10 via, for example, a cellular transmission system.

The end offices 10 are typically arranged into a local exchange carrier network typically including one or more tandem switching offices (not shown) providing trunk connections between end offices. As such, the local exchange carrier network comprises a series of switching offices 10 interconnected by voice grade trunks 18. One or more trunks 18' will typically connect one or more switching offices to at least one switch 10' in other carrier networks.

Each switching office 10 has at least minimal SS7 signaling capability, which is conventionally referred to as a signaling point (SP) in reference to the SS7 network. In the local exchange network, at least one of the switching offices 10, and preferably all, are programmed to recognize identified events or points in call (PICs). In response to a PIC, the switching office 10 triggers a Transaction Capabilities Applications Protocol (TCAP) query message through the signaling network to an Integrated Service Control Point (ISCP) 22 for instructions relating to AIN type services. Switching offices having the full PIC recognition and signaling capabilities are referred to as service switching points (SSPs).

The ISCP 22 offers AIN routing control functionalities to customers of the local exchange carrier. For example, the ISCP includes a database (not shown) containing call processing records (CPRs) for controlling that carrier's AIN routing services. The ISCP 22 may also access a separate database, for example, to supplement its routing tables for certain services. In the preferred system, a second function of the ISCP is to serve as a mediation point. Specifically, the ISCP mediates queries and responses between the local exchange carrier network components and databases operated by other carriers.

The ISCP 22 is an integrated system, and includes a Service Management System (SMS), a Data and Reporting System (DRS) and the actual database referred to as a Service Control Point (SCP). The ISCP also typically includes a terminal subsystem referred to as a Service Creation Environment or SCE for programming the database in the SCP for the services subscribed to by each individual business customer. The components of the ISCP are connected by an internal, high-speed data network, such as a token ring network.

The switches 10 typically comprise programmable digital switches with CCIS communications capabilities. One example of such a switch is a SESS type switch manufactured by AT&T, although other vendors, such as Northern Telecom and Seimens, manufacture comparable digital switches which could serve as the SSPs and SPs. The SSP type implementation of such switches differs from the SP type implementation of such switches in that the SSP switch includes additional software to recognize the full set of AIN triggers and launch appropriate queries.

Within the local exchange network, the common channel interoffice signaling (CCIS) network includes one or more Signaling Transfer Points (STPs) 20 and data links shown as dotted lines between the STP(s) 20 and the switching offices 10. Typically, STPs 20 are implemented as matching or mated pairs, to provide a high level of redundancy. A data link also connects each of the STPs of pair 20 to the ISCP 22. One or more data links also connect the STPs 20 in the local exchange carrier network to mated pairs of STPs 26 in networks of a second carrier.

The local exchange carrier network may also include one or more intelligent peripherals (IPs) 24. The IP 24 provides enhanced announcement and digit collection capabilities and/or speech recognition. The IP 24 connects to the switch 10 of the local exchange carrier network via an appropriate line circuit. The IP 24 communicates with the ISCP 22 through a data communication network 30 separate from the telephone company switching offices and associated interoffice signaling network. As discussed in detail below, the data communication network 30 is preferably a packet switched network that serves as a signaling network (SINET) enabling communications between AIN elements including the IP and the ISCP. The SINET network 30 transports messages using a standardized transport protocol, such as TCP/IP, and may be implemented using X.25, frame relay, SMDS, or ATM technologies.

Commonly assigned copending application Ser. No. 08/248,980, filed May 24, 1994, entitled "Advanced Intelligent Network with Intelligent Peripherals Interfaced to the Integrated Services Control Point" (attorney docket no. 680-076) provides a detailed disclosure of an AIN type network, including the structure of an SSP switch, the structure of an ISCP and the structure of an IP, and the disclosure of that application is incorporated herein in its entirety by reference.

As shown in FIG. 1, the STP's 20 in the local exchange carrier network are connected by data links, such as SS7, to the STP's 26 of a second regional serving area, which may be another local exchange carrier, or an inter-exchange carrier. As shown in FIG. 1, the second carrier network comprises a Services Control Point (SCP) 28 in communication with the SINET 30. In such cases, the carrier at the second regional serving area would have a cooperative arrangement with the first local exchange carrier (having the ISCP 22 and the IP 24) to share network resources via the SINET 30. The SCP 28 includes databases storing routing tables, which typically are more limited than those in the ISCP 17. Although the range of trigger events is limited, the switching systems 10' in the second carrier network can query the corresponding SCP 28 via the STP 26 for routing information.

An end office switching system 10 shown in FIG. 1 normally responds to a service request on a local communication line connected thereto, for example an off-hook from station 12 followed by dialed digit information, to selectively connect the requesting line to another selected local communication line, for example to the line to station 12a. The connection can be made locally through only the connected end office switching system but typically will go through a number of switching systems.

In the normal call processing, the central office switching system responds to an off-hook and receives dialed digits from the calling station. The central office switching system analyzes the received digits to determine if the call is local or not. If the called station is local and the call can be completed through the one central office (intraoffice call), the central office switching system connects the calling station to the called station. If, however, the called station is not local, the call must be completed through one or more distant central offices (interoffice call), and further processing is necessary. If at this point the call were connected serially through the trunks and appropriate central offices between the caller and the called party using in-band signaling, the trunks would be engaged before a determination is made that the called line is available or busy. Particularly if the called line is busy, this would unnecessarily tie up limited voice trunk circuit capacity. The CCIS system through the STP's was developed to alleviate this problem.

In the CCIS type call processing method, the originating end office switching system suspends the call and sends a message through the CCIS network to the end office switching system serving the destination telephone line. The terminating end office determines whether or not the called station is busy. If the called station is busy, the terminating end office so informs the originating end office via CCIS message, and the originating end office provides a busy signal to the calling station. If the called station is not busy, the terminating end office so informs the originating end central office. The originating office provides ringback to the caller, and the terminating office applies ringing current to the line to the called party. When the telephone station connected to the called line goes off-hook, the terminating switching office informs the originating switching office, and the two offices establish a telephone connection via the trunks and end offices (and/or tandem offices) of the network between the calling and called stations.

For an AIN type service, such as call redirection based on data stored in the ISCP 22, the end offices and/or tandems are SSP capable and detect one of a number of call processing events, each identified as a 'point in call' (PIC), to trigger AIN type processing. Specifically, in response to such a PIC, a switching system such as switch 10 suspends call processing, compiles a call data message, also referred to as a TCAP query message, and forwards that message via common channel interoffice signaling (CCIS) links and one or more STPs 20 to an ISCP 22. If needed, the ISCP 22 can instruct the particular switching office to obtain and forward additional information. Once sufficient information has reached the ISCP 22, the ISCP 22 accesses its stored data tables and or data in external databases to translate the received data into a call control message and returns the call control message to the switching office via the STP 20 and the appropriate CCIS links. The switching office 10 uses the call control message to complete the particular call through the public switched network in the manner specified by the subscriber's data file in the ISCP 22.

The SCP 28 offers similar capabilities in the network of the other carrier, but the range of service features offered by that database is more limited. For example, the SCP 28 may offer 800 number calling services with a limited number of related call routing options. If a caller at station 12 dials an 800 number corresponding to the other carrier, the switch 10 routes the call to a switch in the other carrier, which recognizes the 800 number in the CCIS information provided with the call and launches a CCIS query to the SCP 28. The SCP 28 translates the dialed 800 number into an actual destination number, and transmits a CCIS response message back to the switch generating the CCIS query, which then routes the call through the public network to the station identified by the number sent back by the SCP 28, using CCIS call routing procedures of the type discussed above.

In a mediated call processing operation, a switch such as SSP switch 10 reaches a point in call (PIC) in processing a particular call which triggers AIN type processing. A variety of triggers are known including the full range of AIN triggers, such as off-hook, off-hook delay, private dialing plan, virtual numbers (e.g. 500, 800, 900), terminating attempt, etc. In response to the PIC trigger, the switch 10 launches a TCAP query through the STP 20 to the ISCP 22. The ISCP 22 accesses the relevant call processing record (CPR) for the subscriber. In a mediated service the CPR will identify a plurality of carriers and/or the carriers' databases, for calls satisfying different predetermined criteria.

The ISCP 22 proceeds to obtain call control or routing information that the switch 10 needs to process the call. If conditions relating to the present call conform to criteria for processing of the call by the local exchange carrier, then the ISCP 22 retrieves a CPR from its own internal SCP database to determine how to process the call and provides an appropriate response message back to the switch 10. If the call meets other criteria, then the ISCP 22 communicates with a selected one of a plurality of other SCPs, such as SCP 28 through the SS7 network (i.e., via STP 26). Alternatively, the ISCP 22 may communicate with the SCP 28 via the SINET 30. The ISCP 22 may access a separate database to obtain information needed to direct messages through the SS7 network to the appropriate SCP.

The one SCP 28 will contain a call processing record (CPR) for providing the subscriber a customized service on the particular type of call. The subscriber has previously communicated to the carrier how certain calls should be processed, and the carrier's personnel will have established the appropriate CPR in the SCP 28.

The SCP 28 accesses the CPR to determine how to process the particular call and returns an appropriate instruction, in a TCAP response message, to the ISCP 22. The ISCP 22 in turn performs a mediation function. Specifically, the ISCP 22 processes the instructions from the alternate carrier's SCP to insure validity and compatibility with the processes of the elements of the local exchanged network that will handle the call. Based on validated instructions, the ISCP formulates an appropriate TCAP response message. The ISCP 22 transmits that message through SS7 links and one or more STPs 20 to the switch 10.

Figure 2:
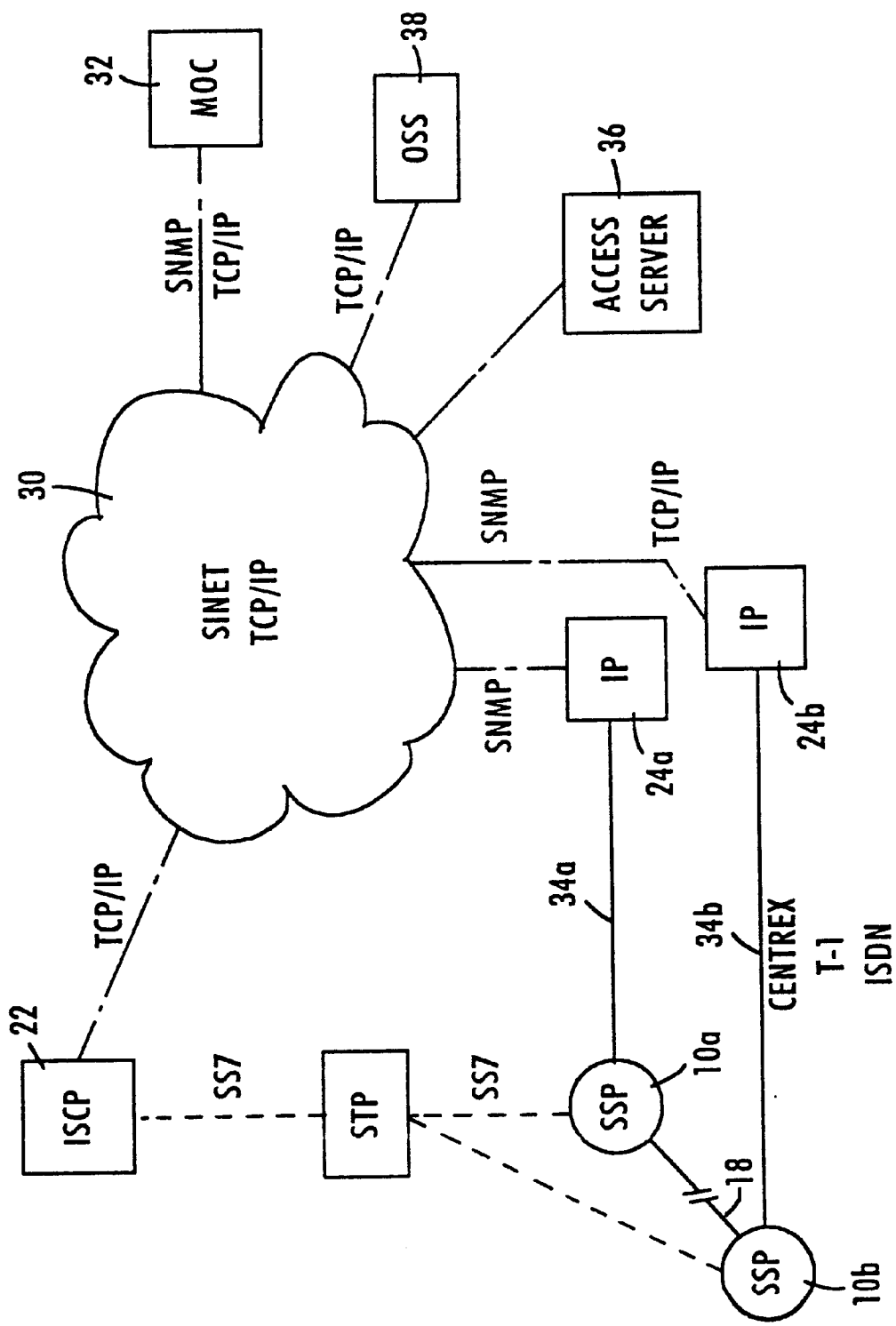
FIG. 2 is a block diagram of an arrangement for monitoring and controlling operations for the Advanced Intelligent Network of FIG. 1 according to an embodiment of the present invention.

FIG. 2 is a block diagram of a system architecture for monitoring and controlling operations for elements of the AIN of FIG. 1. According to the present invention, a maintenance and operations console (MOC) 32 sends and receives AIN management operations messages to and from the SINET 30 in a standardized network management message format known as Simplified Network Management Protocol (SNMP). The SNMP messages, also referred to as objects, are transported by the SINET 30 according to TCP/IP protocol to and from the corresponding AIN element.

According to the preferred embodiment, the MOC 32 manages the operations of the intelligent peripheral devices IP 24a and IP 24b, and as such is also referred to herein as an IP MOC. However, since the MOC 32 sends and receives SNMP objects via the SINET 30 using TCP/IP protocol, the MOC 32 is able to manage the operations of any of the AIN elements based on the network address of the AIN element.

As discussed in detail below, the MOC 32 uses object-oriented models of the AIN elements to identify error status messages and available corrective actions. A Management Information Base (MIB) stores the relationships between objects in the advanced intelligent network. Thus, since each AIN element can be characterized by a set of MIB objects, the MOC 32 can control any AIN element once the MOC 32 has been provided with the set of MIB objects for the corresponding AIN element. Moreover, as new AIN elements are added to the advanced intelligent network and connected to the SINET 30, the MOC 30 identifies the new AIN elements by their TCP/IP address, and can automatically initiate management and control of the new AIN elements by requesting the MIB objects of the new AIN elements.

The term "AIN element" refers to a program-controlled node of the public communications network, disclosed as an AIN network, that receives and stores data in order to activate, modify or delete an AIN service for a subscriber. Hence, if the MOC 32 receives an alarm from an AIN element, the MOC 32 can output SNMP objects to one or more AIN elements to prevent loss of service. For example, if the MOC 32 receives an SNMP object from the IP 24a that identifies an alarm for an Interactive Voice Response (IVR) function that cannot be performed, the MOC 32 may send an SNMP object that identifies an instruction to the operating system of the IP 24a to reset the IVR software. In addition, operation scripts and other programming information may be provided to the IP 24a to modify functions such as voice response unit access parameters.

In some cases the MOC 32 may determine that a fail-over procedure is necessary due to an inability to perform corrective action automatically, for example in cases where a software restart is insufficient. For example, if the MOC 32 receives an SNMP object indicating that a module of the IVR software of the IP 24a is malfunctioning, the MOC 32 may send SNMP objects to the IP 24a and the IP 24b instructing the two AIN elements to establish a communication session whereby the IP 24a partially uses the module of the IVR software from IP 24b to complete call processing functions while the malfunction in the IP 24a is corrected, and the IP 24b reduces its call processing capacity to accommodate the processing needs by the IP 24a. Alternatively, if the MOC 32 determines that the IP 24a can no longer perform call processing functions, the MOC 32 may reroute incoming calls to the IP 24a by busying out the telephone lines 34a, causing the SSP 10a to roll over incoming calls to another IP, such as IP 24b.

If the MOC 32 determines that calls to IP 24a should be rerouted indefinitely, the MOC 32 can send a rerouting message to the SSP 10a via the ISCP 22. For example, the MOC 32 may output an SNMP message to the AIN access server 36, which would convert the message to an ISCP-compatible interface protocol (discussed below). The access server 36 would then route the message to the ISCP 22, which would then update the CPR data in its internal databases, and send a message to the SSP 10a to update the translation tables to reroute the calls to the IP 24b via the trunk lines 18. Alternatively, the MOC 32 may send a message to an Operational Support System 38 to reassign network resources based on available capacity, and to initiate and track corrective maintenance and repair of the failing IP 24a.

Thus, the MOC 32 is able to reroute network resources as necessary to maintain subscriber services in the event that an AIN network element fails. If necessary, CPR data may be updated in the databases in the ISCP 22 and/or the SCP 28 in order to change services such as call forwarding, call blocking, call roaming, etc.

As indicated above, the MOC 32 may monitor other AIN elements that are recognized on the basis of their TCP/IP address on the SINET 30. For example, the AIN may include an access server 36 that processes service change requests downloaded from the customer premises equipment. The access server 36 is provided with a plurality of interface protocols for each of the programmable nodes of the AIN. The access server 36 automatically converts the service request carrying the transaction data, for example in an ASCII format or SNMP protocol, to AIN-compatible provisioning data having the appropriate interface protocol, such as the Bellcore TA-1129+ interface used in the ISCP 22. The access server 36 preferably includes all interface protocols for the programmable AIN elements, including: TA-1129+ Interface; Generic Data Interface (GDI); SPACE Provisioning Interface; ISCP Billing Collector Interface; GR-1129-CORE Interface; and Transaction Capabilities Application Protocol (TCAP).

Thus, the MOC 32 not only may be able to monitor the access server 36, but may also send SNMP objects to the access server 36 for conversion to a format compatible for an AIN element. A more detailed description of the access server 36 is provided in commonly-assigned, copending application No. 08/538,935, filed Oct. 4, 1995, entitled AIN CUSTOMER PROVISIONING SYSTEM (attorney docket No. 680-146), the disclosure of which is incorporated in its entirety by reference.

Figure 3:
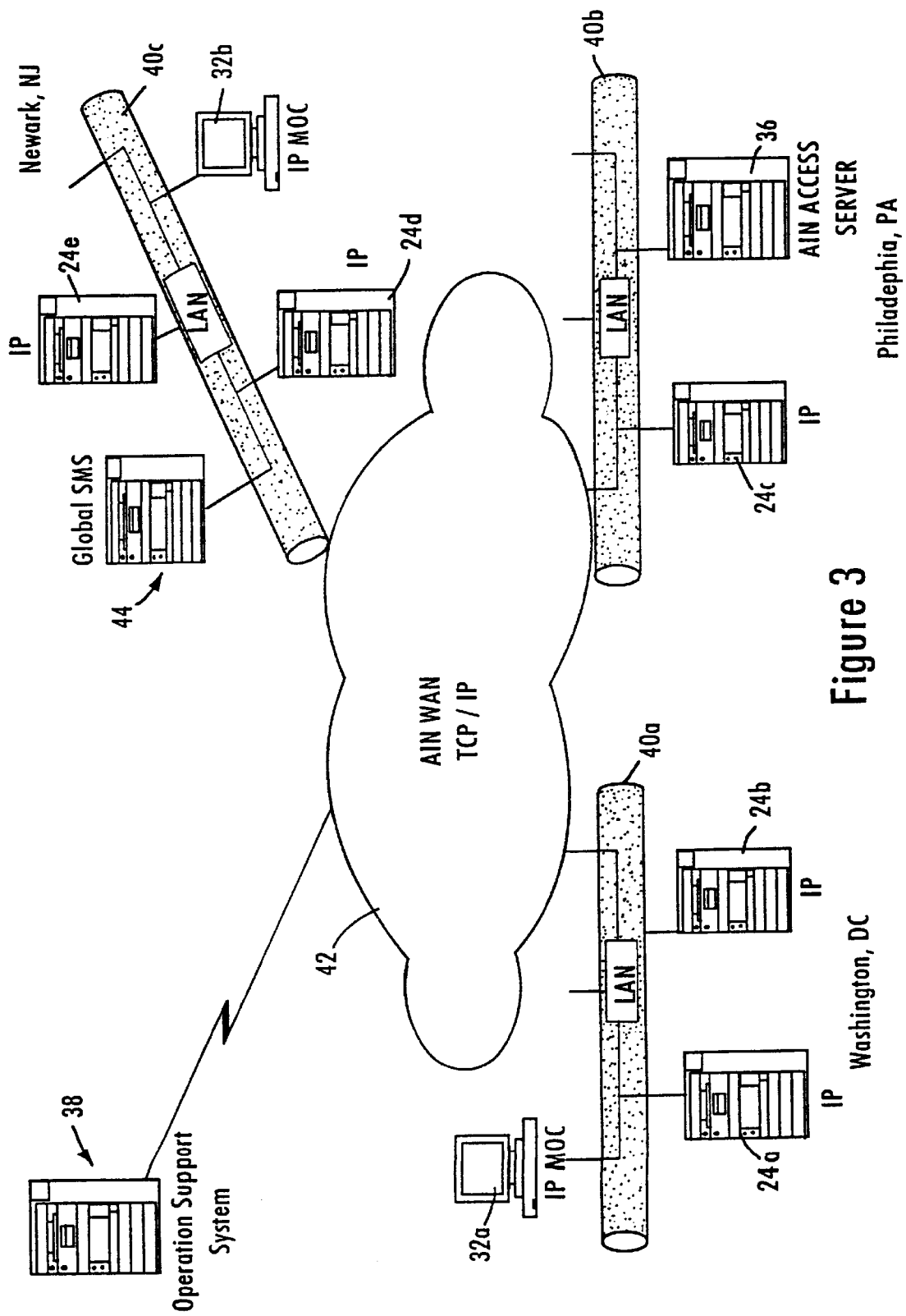
FIG. 3 is a block diagram of an alternative system architecture for monitoring and controlling operations in an AIN according to another embodiment of the present invention.

FIG. 3 is a block diagram of an alternative system architecture for monitoring and controlling operations in an AIN according to another embodiment of the present invention. As shown in FIG. 3, the advanced intelligent network is composed of a plurality of AIN elements distributed at different geographic areas. For example, the AIN elements IP 24a, IP 24b and MOC 32a are physically located in Wash., D.C., and communicate locally by a local area network (LAN) 40a. Similarly, a second group of AIN elements, namely an IP 24c and the AIN access server 36, are physically located in Philadelphia, Pa. and communicate locally by a local area network 40b. Each of the LANs 40 use a standardized transport protocol, such as TCP/IP, and as such can transport SNMP objects. Thus, the MOC 32a can monitor the IP 24c by sending SNMP messages between the local area networks 40a and 40b via a wide area network (WAN) 42. Similarly, the WAN 42 services a local area network 40c that services the AIN elements physically located in Newark, N.J., for example, an IP 24d, IP 24e, a Global SMS 44 performing service management functions for the AIN services, and a MOC 32b. Thus, the specific implementation of the SINET 30 in FIG. 2 includes the LANs 40a, 40b, and 40c, and the WAN 42. Although not shown, AIN elements other than the IP, AIN Access Server and the Global SMS may be connected to the SINET, for example a Billing/Data Collector, etc.

As shown in FIG. 3, the AIN is serviced by the MOC 32a and the MOC 32b. The OSS 38, as shown in FIG. 3, has its own interface to the WAN 42. The OSS 38 is responsible for assignment of available and assignable inventory throughout the AIN, and tracks service orders for maintenance and repair jobs by service personnel. The OSS 38 will also assign the resources of the IP MOC 32a and 32b to monitor and manage predetermined AIN elements. Thus, the MOC 32a may be assigned to manage the IP 24a, 24b, and 24c, whereas the MOC 32b may be assigned to monitor the IP 24d, the IP 24e, and possibly the AIN access server 36. If desired, the MOCs 32a and 32b may share information and resources as needed, operating as distributed servers by sharing monitoring and management functions.

Figure 4A:
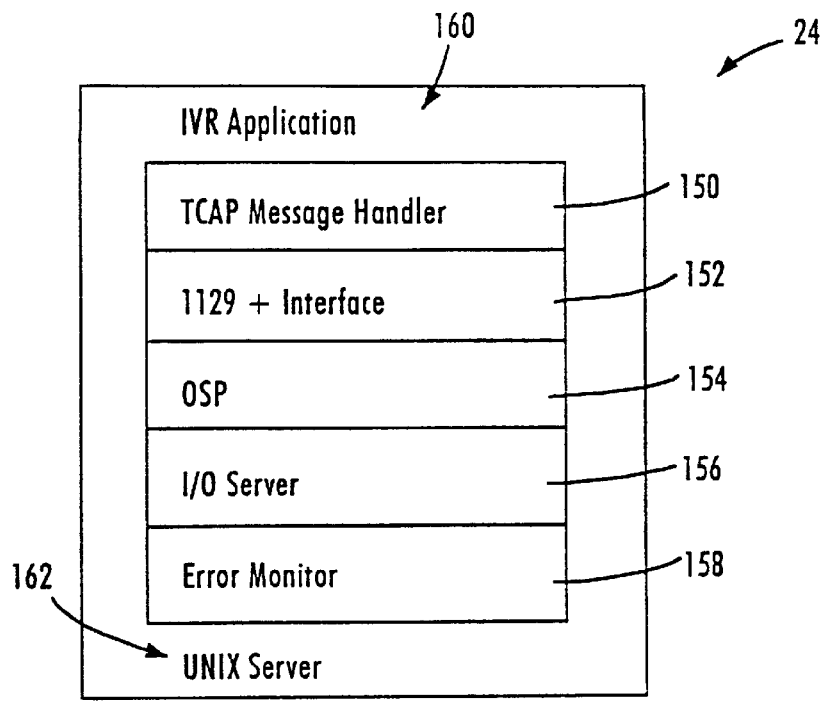
FIGS. 4A, 4B and 4C are diagrams illustrating the software architecture of the Intelligent Peripheral (IP) and the Maintenance Operations Console (MOC) of FIGS. 2 and 3.
Figure 4B:
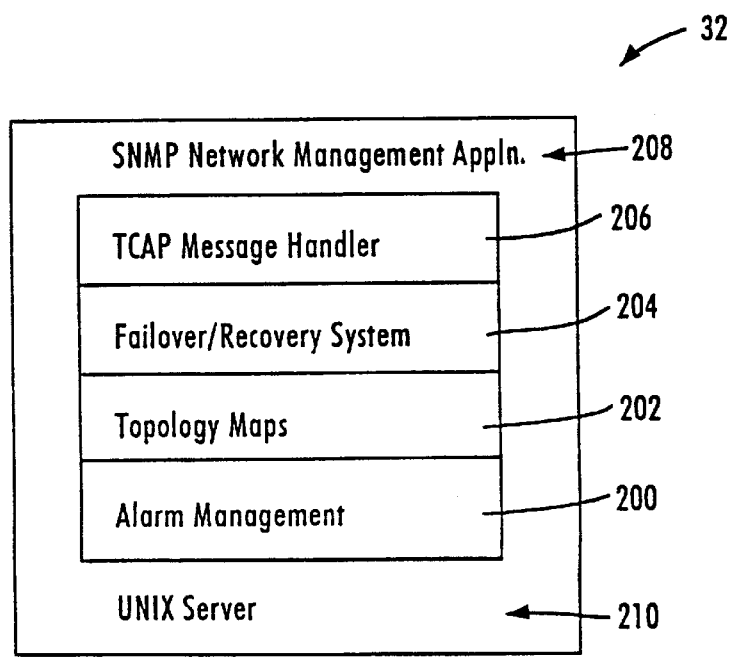

FIGS. 4A and 4B are block diagrams showing the software architecture of the IP 24 and the MOC 32, respectively. As shown in FIG. 4A, the IP 24 includes a TCAP message handler 150 that processes TCAP messages to and from the ISCP. For example, the TCAP message handler may generate a TCAP query message during an IVR system with a caller, whereby the IP collects digits, such as a password, to determine whether a caller should be authorized to access a service. After collecting the digits, the TCAP message handler 150 generates a TCAP message to the ISCP including the collected dialed digits input by the caller.

The IP 24 also includes an 1129+ interface 152 for processing provisioning information related to the ISCP. Additional details regarding the use of 1129+ are disclosed in the above-incorporated application No. 08/538,935 (Docket No. 680-146). The IP 24 also includes a digital signal processor (DSP) 154 for generating voice messages during the interactive call session. The DSP processor 154 also handles connecting and disconnecting of voice channels and T-1 connections. The I/O server 156 manages all I/O operations between the IP 24 and the SINET 30, including managing the transport, network, data link, and physical layers shown in FIG. 8. These modules 150, 152, 154, 156, and 158 are used to support the overall applications resident in the IP, for example an Interactive Voice Response (IVR) Application 160. An exemplary software platform performing IVR functions is the IBM Direct Talk 6000. Alternatively, another application such as Online Transaction Processing (OLTP) may be resident in the IP, which may be implemented using Online Transaction Processing software from Transarc, Inc., Pittsburgh, Pa. All the software systems of FIG. 4A are supported by an operating system server, such as a UNIX server 162.

FIG. 4B is a diagram of the software architecture of the MOC 32. As shown in FIG. 4B, the MOC 32 includes an alarm management module 200 that receives and organizes received alarms from the AIN on the basis of the AIN element sending the alarm and the operations priority (i.e., the severity) of the alarm. The MOC system 32 also includes a topology map module 202 that organizes the alarms for display on a graphic user interface (GUI). A failover/recovery system 204 performs corrective countermeasures by outputting correction commands to different AIN elements in response to the detected alarms and user selection inputs. In some cases, the corrective measures are generated in response to manual user inputs; in some cases however, the system may be automated to provide immediate generation of error correction upon the detection of a critical alarm. The MOC 32 also includes a TCAP message handler to handle messages between the IP 24 and the ISCP 22. These modules 200, 202, 204 and 206 are used to support the overall applications of the SNMP network management application 208, which executes the monitoring, detection and correction of alarms in the AIN network. Finally, all the above-identified functions are supported by a operating system server, such as a UNIX server 210 or a Windows NT server.

Figure 4C:
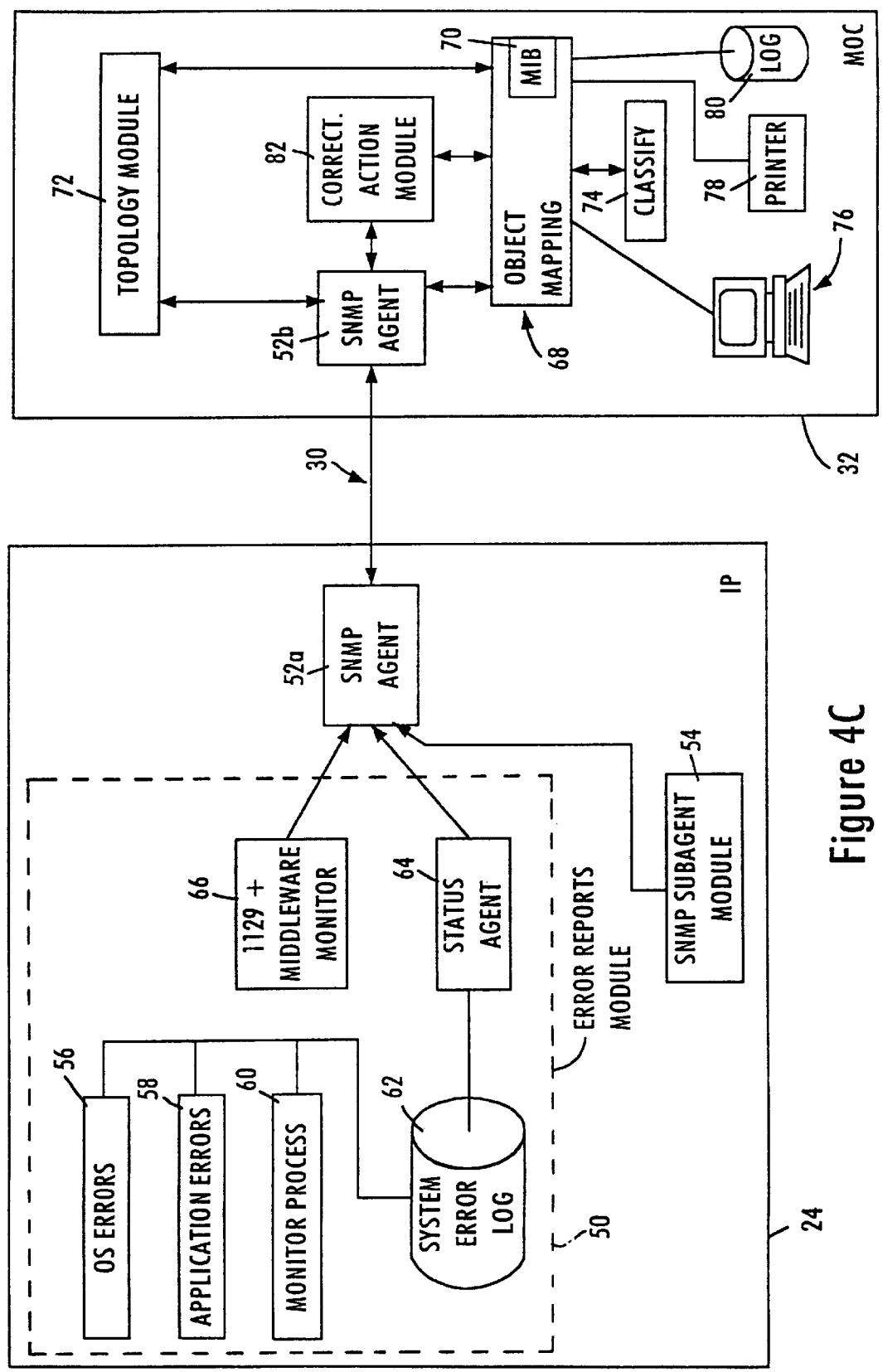

As shown in FIG. 4C, the error monitor 158 of the IP 24 comprises an error reports module 50, an SNMP agent module 52a, and an SNMP sub-agent module 54. The error reports module 50 generates and collects all error messages from the hardware and software subsystems of the IP 24 that are not in SNMP format, and outputs status messages to the SNMP agent 52a. The SNMP agent 52a collects the error status messages from the error reports module 50 and converts the collected status messages into SNMP protocol for transmission to the MOC 32 via SINET 30. The SNMP agent 52a also monitors SNMP-based systems and outputs any error messages generated in SNMP format. The SNMP sub-agent module 54 monitors the operations and performance of the SNMP platform 52a. Hence, if there is an error in the SNMP platform itself, the SNMP sub-agent module 54 will output an error message to the SNMP agent 52a, indicating that the SNMP platform itself is malfunctioning.

The error reports module 50 is designed to provide status error reports for hardware and software processes that are not part of the SNMP platform. Specifically, SNMP has been used conventionally to monitor only whether a device on a network is operational or non-operational. According to the present invention, however, the use of SNMP is expanded to monitor the performance of hardware and software subsystems within an individual network component.

FIG. 8 summarizes the architecture of SNMP relative to the ISO/OSI model and the Defense Advance Research Projects Agency (DARPA) model, around which the Internet protocols and TCP/IP were developed.

SNMP is an open systems standard that delivers status and administration information from the IP 24 and the TCP/IP network 30 to the MOC 32. SNMP explicitly minimizes the number and complexity of management functions realized by the management agent itself. Specifically, SNMP separates the management architecture from the architecture of hardware devices, such as hosts and routers, widening the base of multi-vendor support.

The flexibility of SNMP is based on the use of variables as a means of representing physical and logical resources on the managed system. The management protocol only has commands to read and update the value of the variables. The actual process of reflecting the real world in the values of the variables is a function of the SNMP agent 52a. There are four protocol verbs supported by SNMP:

get—requests the SNMP agent 52a on the managed system (i.e., the IP 24) to retrieve the value of a particular variable and return it to the requester (i.e., the MOC 32);

set—requests the SNMP agent 52a to update a variable on the managed system (i.e., the IP 24), and by implication change the system values that it represents (note that set is naturally not supported for all variables, as remote addition of hardware would not be performed);

getnext—requests the SNMP agent 52a on the managed system to increment to the next variable after the one specified in the request and return it to the requester. This protocol verb enables a management station such as the MOC 32 to learn the configuration of a remote system.

trap—sends an unsolicited message to the management station such as the MOC 32 describing an extraordinary event or failure.

Due to the open nature of the protocol standards, the variables used to represent resources on the managed system are encoded on a platform-independent way by using an OSI data description language called Abstract Syntax Notation One (ASN.1). The transport protocol TCP/IP uses only a subset of the full ASN.1 function, formalized in reference RFC 1065, "Structure and Identification of Management Information", the disclosure of which is incorporated herein in its entirety by reference. Objects names using ASN.1 are placed in a tree format, whereby each level of the tree has numbered branches enabling an object to be uniquely identified by a sequence of digits. Thus, all standard Internet MIB objects have a dotted-decimal notation beginning "1.3.6.1.2.1 . . . ". The variables accessed by the SNMP verbs described above are instances of these objects, and whenever a variable is specified in an SNMP request or response it is encoded in the ASN.1 notation.

As discussed below, the MOC 32 maintains a Management Information Base (MIB) including the standard set of object definitions that all SNMP agents 52 in the AIN network are required to support.

In general, the MOC 32 is kept up to date on the status of the AIN nodes by regular polling of the respective SNMP agents. However, in cases where the AIN nodes may need to inform the MOC 32 of an extraordinary event without waiting to be polled, the SNMP agent 52 outputs a "trap". For example, when the IP 24 first comes on-line, the IP 24 may send a cold start trap to the MOC 32 in order to notify the MOC 32 of the existence of the IP 24. A trap tends to be a relatively simple structure, comprising one of six generic types, optional specific type information, the IP address of the originating agent and a reference to the MIB variable affected. The trap thus acts as a trigger, causing the MOC 32 to poll the agent using the SNMP command get and the SNMP command getnext.

Additional details of SNMP protocol may be found in publications by Mark A. Miller, *Managing Internetworks with SNMP*, Henry Holt & Co. (1993), and Marshall T. Rose, *The Simple Book: Introduction to Internet Management*, 2nd Ed., Prentice Hall (1994), the disclosures of which are incorporated in their entirety by reference.

Referring to FIG. 4C, the error reports module 50 of the IP 24 includes a plurality of error detection modules for monitoring operations of various software subsystems in the IP 24. According to the preferred embodiment, the IP 24 is an IBM RS 6000 computer system having primary rate (ISDN) interface cards and digital voice processing cards that operate under the execution of different software subsystems, such as the IBM AIX Operating System, and the IBM Direct Talk 6000 software system. Thus, the disclosed systems and subsystems refer to software modules executed in the IBM RS 6000 computer system. The Operating System (OS) errors module 56 detects errors from the operating system of the intelligent peripheral, which can be implemented, for example, as the AIX System Error Log, which is part of the IBM AIX Operating System. The application errors module 58 monitors and detects errors in the application platform being executed. For example, if the application platform was an interactive voice response (IVR) system, an exemplary implementation would be the error monitoring routines resident in the IBM Direct Talk/ 6000 software executed in the IBM RS 6000 computer system. Finally, the monitor process module 60 outputs error messages based on errors detected in the operation of the modules 56 and 58. In other words, the monitor process module 60 monitors the monitoring systems 56 and 58 themselves to ensure that the original AIX and Direct Talk 6000 errors are being properly detected and reported. The modules 56, 58 and 60 are inherently part of the IP platform provided by a vendor. For example, for an IBM based system, the error messages are output from the modules 56, 58 and 60 in IBM format. These messages are supplied to a system error log 62, which stores the current status of all monitored subsystems as provided by the vendor. The status agent 64 accesses the system error log 62 and compiles a status report for the SNMP agent 52a. Thus, rather than providing a detailed report of the actual errors as generated by the monitoring systems 56, 58, and 60, the status agent 64 supplies the overall status summary of the monitored subsystems.

The 1129+ middleware monitor 66 is a separate monitoring system used to detect errors in additional subsystems in the IP 24. According to the preferred embodiment, the 1129+ middleware monitor 66 is implemented using middleware from Evolving Systems, Inc. This module is used to monitor customized subsystems in the IP 24. For example, the IP 24 will include various resources and application including: Interactive Voice Response System (IVR), On Line Transaction Processing System (OLTP), Voice Recognition, TA 1129+ Interface, Generic Data Interface (GDI), SPACE Provisioning Interface, GR-1129-Core Interface, Billing Collector/Data Distributor Interface, Third Party Application Software, and Custom Software. Thus, to the extent that the IP 24 is not supplied by the vendor as SNMP compliant, all application systems that are not monitored by the vendor's subsystems need to be monitored using supplemental monitoring systems. Thus, the 1129+ middleware monitor 66 supplements the monitoring functions of the modules 54, 56, 58 and 60 to provide custom monitoring services for the remaining elements.

Figure 5:
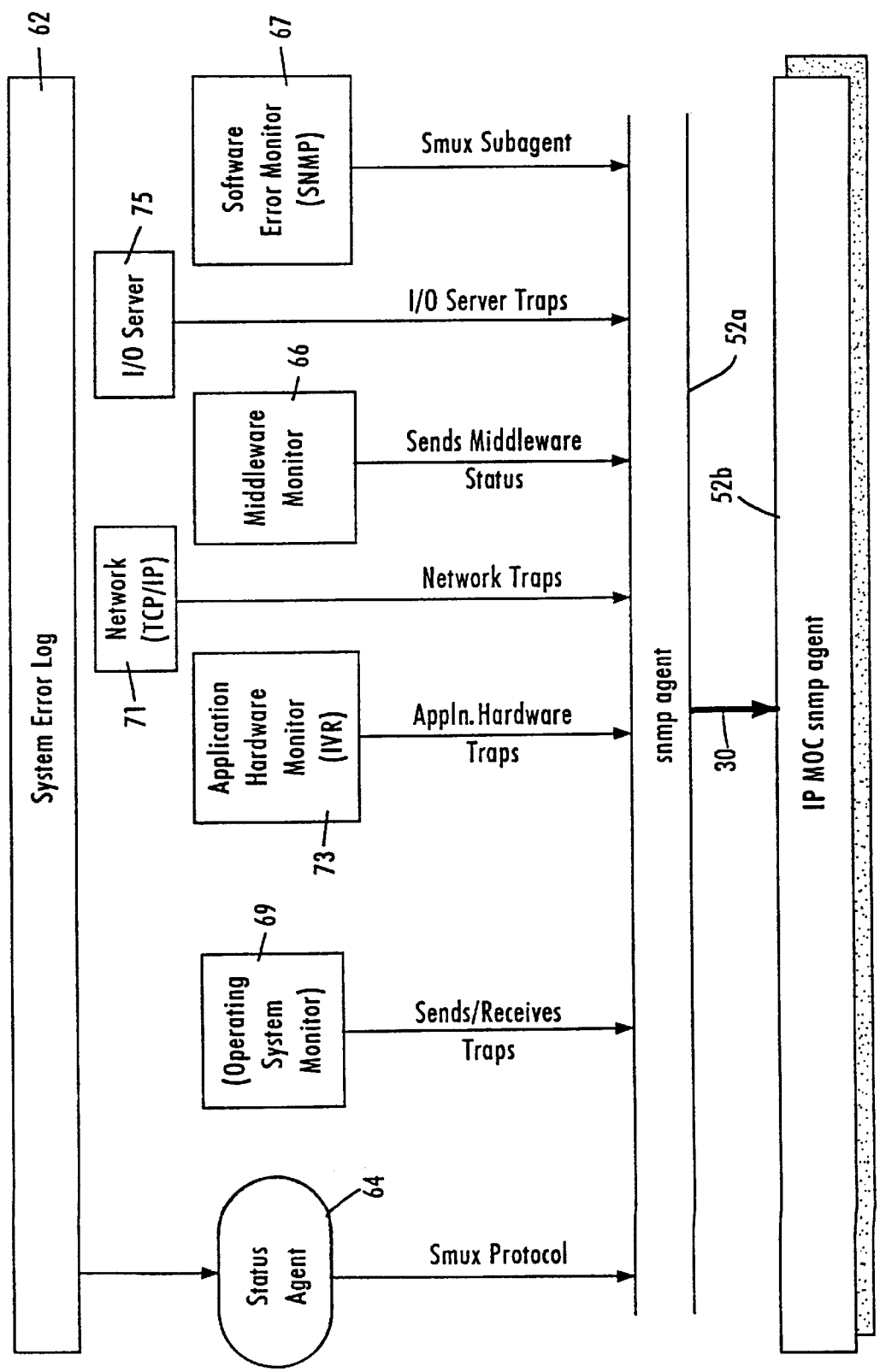
FIG. 5 is a block diagram of the error monitoring architecture of the IP of FIG. 4A.

FIG. 5 is a detailed diagram of the monitoring routines 158 of the IP 24. As shown in FIG. 5, the system error log 62 collects the errors output by the vendor-specified monitoring software subsystems. An example of the system error log 62 is the AIX NetView/6000, manufactured by IBM Corporation. The status agent 54 compiles the error messages from the system error log 62 into a status message, and supplies the errors status message to the SNMP agent 52a for transmission to the SNMP agent 52b of the MOC 32 via the packet switched network 30. Typically, the status agent 64 will compile the status messages on a periodic basis in response to a polling request from the SNMP agent 52b. Similarly, the 1129+ middleware monitor 66 outputs status messages to the SNMP agent 52a in response to polling requests from the SNMP agent 52b. A second sub-agent 67 monitors and outputs status messages regarding the detection of errors of software that operate under SNMP protocol.

In addition, sub-agents in the IP 24 generate traps immediately upon the detection of critical errors. For example, the operating system monitor sub-agent 69 generates traps upon the detection of major errors, such as: low paging space, adapter errors, file system usage threshold, CPU utilization threshold. Similarly, a network sub-agent 71 generates traps upon error and/or status conditions detected in the TCP/IP interface, such as: interface down, cold start trap (informational only), warm start trap (informational only), and node down. The IVR sub-agent 73 generates a trap when the hardware circuit interfaces associated with the particular application platform are down, in this case IVR. Finally, the I/O server sub-agent 75 outputs a trap either when the I/O server is down, or when the message queue has reached a predetermined backlog.

Thus, the IP 24 comprises a plurality of agents and sub-agents to detect and report informational and critical errors in substantially all the software subsystems of the intelligent peripheral 24. Although the monitoring sub-agents are shown as separate systems in FIG. 5, these subsystems may be implemented in a single server, or a plurality of servers, as desired.

Referring to FIG. 4C, the SNMP objects are transmitted by the SNMP agent 52a of the IP 24 to the MOC 32 using the TCP/IP transport protocol of the packet switched network 30. The MOC 32 comprises an SNMP agent 52b that receives the SNMP objects from the TCP/IP transport packet, and which identifies each AIN element by its TCP/IP address. The SNMP agents 52a and 52b perform complementary functions across the SINET 30, and thus function as communication modules for the respective network elements. The MOC 32 also comprises an object mapping system 68 having a management information base 70 (MIB) that identifies object relationships for the object-based models of the network. The MID 70 constitutes the collection of objects in the AIN network model, and the SNMP agent 52b uses the MIB 70 to determine the subsystem identified, and the error status of that subsystem based upon the previously-stored relationship between the software subsystem object and the error report object in the MIB 70.

The object mapping module 68 assigns operational priorities to the received object based upon the object relationships identified in the MIB 70. For example, the SNMP agent 52b may determine that the SNMP object identifies an AIX error "CPU utilization threshold exceeded". The object mapping module 68 accesses a classification script 74 that classifies errors as informational, minor, major, and critical. In this case, the AIX error "CPU utilization threshold exceeded" is assigned a critical operational status.

Once the operational priority of the identified error status has been determined, the information needs to be presented to a network operator in a convenient, organized format. The MOC 32 includes a topology module 72 that receives the SNMP object and assigns the received SNMP object within a relational hierarchy for presenting the information in an organized format. For example, hierarchal layers of organization may include location, AIN element type, operational priority, and system organization. As disclosed in detail below with respect to FIGS. 9A–9J, the topology module organizes the received objects for display of the identified error status plus the operational priority.

The MOC 32 uses a graphical user interface (GUI) workstation 76 for displaying graphical objects, such as icons, that represent the status of the identified errors, including the operational priority assigned to the identified error. The MIB 70 stores icon objects that have predetermined shapes and colors, and the MIB 70 will include the relationship of identifying trap severity by icon colors, so that trap status messages that are informational, minor, major, and critical are displayed as the colors, green, yellow, orange, and red, respectively.

The error status reports from the SNMP objects are also output to a printer 78 for providing a hard copy record of the event. The MOC 32 also comprises a log filing system 80 for archiving the received error status reports for a predetermined length of time, for example one month.

The MOC 32 also comprises a corrective action module 82 that initiates corrective measures by outputting SNMP objects via the SNMP agent 52b to different AIN elements in response to user selection of a displayed icon (i.e., by clicking a cursor on a selected icon) representing an error status of a selected hardware or software subsystem displaying a operational priority of information, minor, major, or critical. Specifically, as a user selects a displayed icon, the corrective action module 82 accesses the MIB 70 to identify the subsystem object that is sending an alarm, the operational priority of the alarm, and the available corrective countermeasures. The corrective action module 82 processes the information to determine a corrective action countermeasure, at which point an SNMP object is generated by the SNMP agent 52b based on information from the MIB 70 that identifies the target subsystem and the corrective action countermeasure to be taken. For example, the corrective action module 82 may output an object to the SNMP agent 52b that requires the IP 24a to reset the Direct Talk/6000 SNMP agent. Alternatively, the corrective action module 82 may send a switch redirect message to the ISCP 22 after translation by the access server 36, requesting that the SSP 10a redirect incoming calls to the IP 24b instead of the IP 24a.

Figure 6:
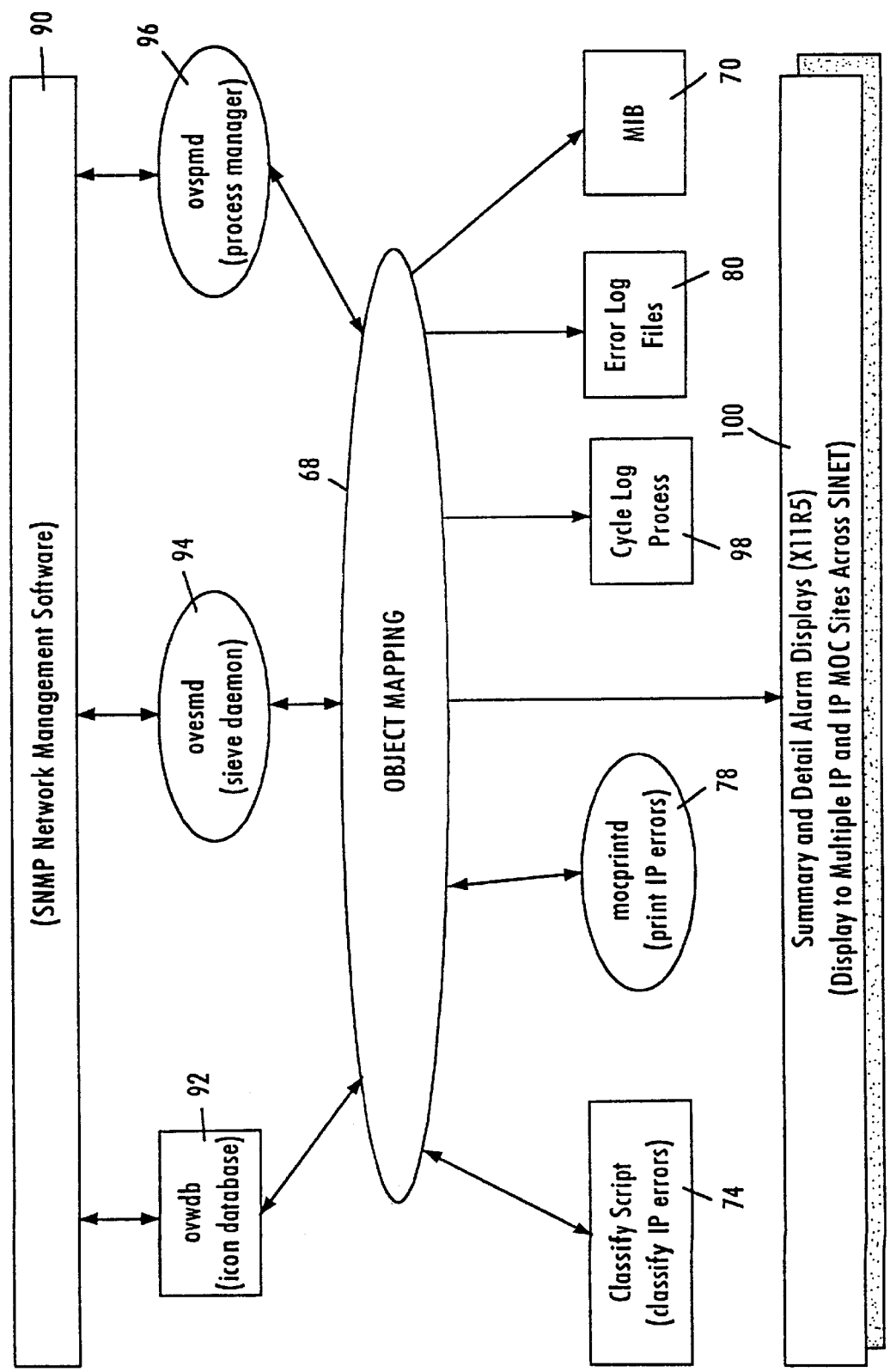
FIG. 6 is a block diagram of the software architecture of the MOC alarm subsystem of FIG. 4B.

FIG. 6 is a block diagram of the software architecture of the MOC alarm subsystem 200. The alarm subsystem 200 generates the alarms based on the received SNMP objects under the control of the MOC operating system 90. The operating system 90 of the maintenance operations console 32 is an SNMP network management software which may be implemented, for example, by using readily-available "off-the-shelf" software systems such as the IBM NetView 6000. Alternatively, the software product OpenView from Hewlett Packard may be used. Both products use open systems standards to establish an operating environment for the MOC 32, as opposed to relying upon proprietary software. Thus, a particular advantage of the present invention is that the MOC 32 may be implemented using open systems standard products, such as the IBM NetView 6000 or the Hewlett Packard OpenView, in order to develop the standardized SNMP management system.

As shown in FIG. 6, the MOC 32 uses open platform software routines to perform various software functions. For example, the software system of FIG. 6 includes an icon database 92 (ovwdb) that provides a list of standardized icons that may be used for graphics presentation on the user display terminal 76. Similarly, a sieve daemon 94 (ovesmd) performs generalized filtering functions. Finally, the process manager 96 (ovspmd) manages operations between the operating system management software 90 and the object mapping module 68. As recognized in the art, the three modules 92, 94 and 96 have the prefix "ov", indicating that these modules are predefined modules available from the OpenView system from Hewlett Packard.

The alarm subsystem of FIG. 6 also includes the classification script 74 that identifies the relative priority from an operational standpoint of the received SNMP object. A MOC printer daemon 78 controls the printing of the IP errors, and a cycle log 98 provides temporary storage of the received errors. After the object mapping module 68 identifies the received SNMP objects as specific errors of identified IP subsystems with a corresponding operational priority, the information is provided to a summary and detail alarm display 100, which distributes the alarm information accordingly. If necessary, the MOC 32 will provide the alarm data to other AIN elements, including other MOC devices, via the SINET 30.

Figure 7:
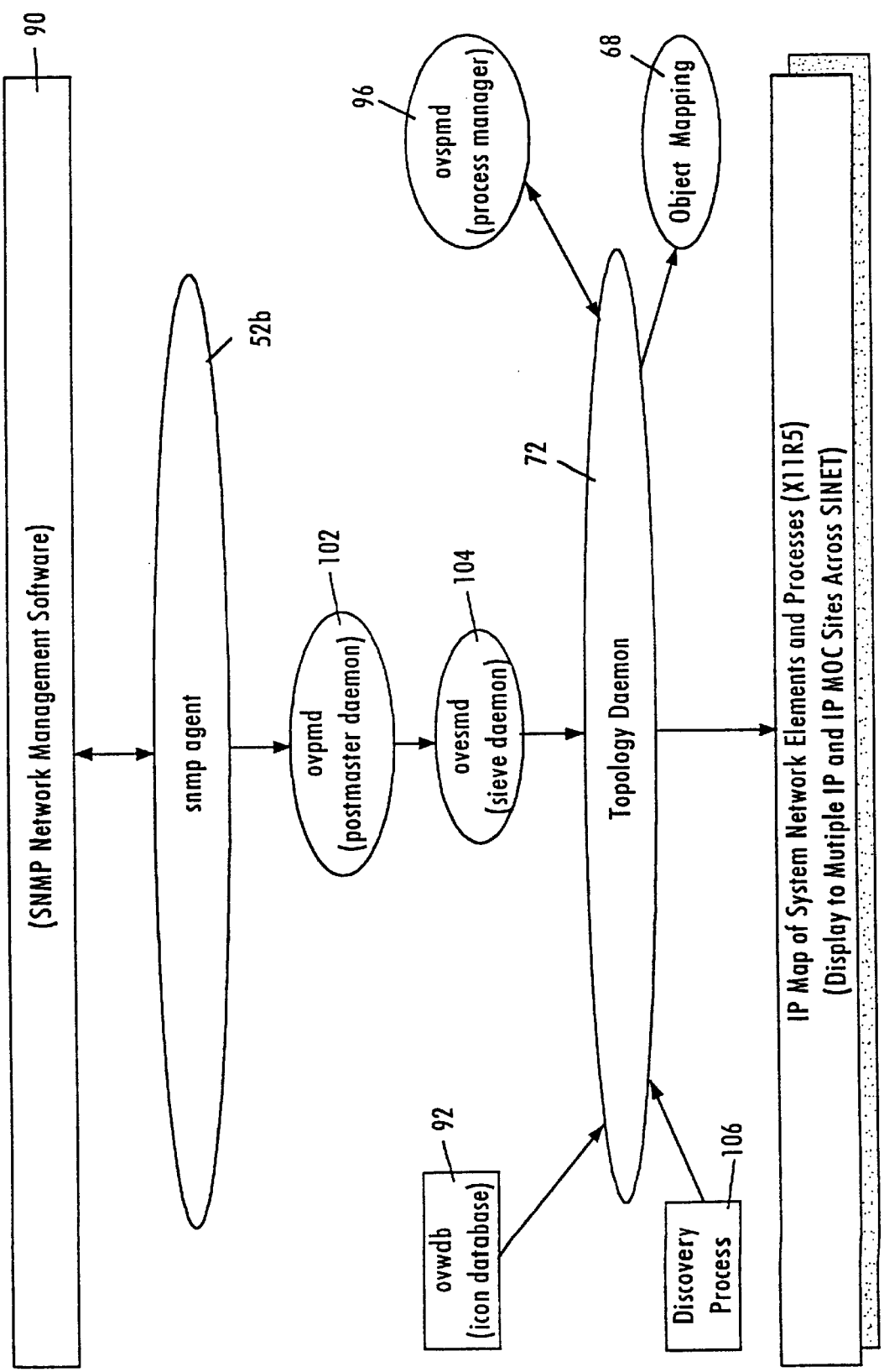
FIG. 7 is a block diagram of the software architecture of the MOC topology subsystem of FIG. 4B.

FIG. 7 is a block diagram of a software architecture of the topology system 202 that organizes the alarms for presentation on the graphical user interface workstation 76. The software architecture for the topology system is controlled by the SNMP network management software 90, used to control basic operations of the SNMP agent 52b. The SNMP agent 52b receives packet data from the packet switched network SINET 30, assembles the received packets to recover the SNMP object sent by the AIN elements, also referred to as protocol data units (PDUs), and outputs the collected SNMP objects for further processing.

A postmaster software module 102 (ovpmd) also referred to as a postmaster daemon, reviews the received SNMP object and verifies the network addressing and protocol to ensure compliance. The topology system also includes a sieve daemon 104 (ovesmd) that filters out irrelevant or unnecessary data objects, based upon the object relationships from the object mapping module 68. Finally, a process manager 96 (ovspmd) manages the functions of the topology daemon 72. As recognized in the art, the software modules 92, 94, 96, 102, and 104 each are OpenView platform software modules, identified by the prefix "ov". Accordingly, the detailed functions of the modules in FIGS. 6 and 7 having the prefix "ov" are consistent with the -commercial specifications published by Hewlett Packard for the OpenView systems.

The topology daemon 72 provides a relational hierarchy for presenting on the graphical user interface (GUI) workstation 87 the status of the identified errors as represented by the received SNMP objects, and the operational priority of the identified errors. The topology module identifies the object relationships from the MIB 70 and obtains the operational priorities from the object mapping module 68. The topology daemon 72 assigns and organizes each of the objects to an icon from the icon database 92, and assigns a color to a specific icon based upon the operational priority of the object. The topology daemon 72 outputs the organized objects for display on the GUI workstation 76. Alternatively, the topology daemon 72 may output the objects to the SNMP subagent 52b for display at a remote terminal, such as a data terminal having a data link to the SINET 30, or another MOC 32.

Figure 9A:
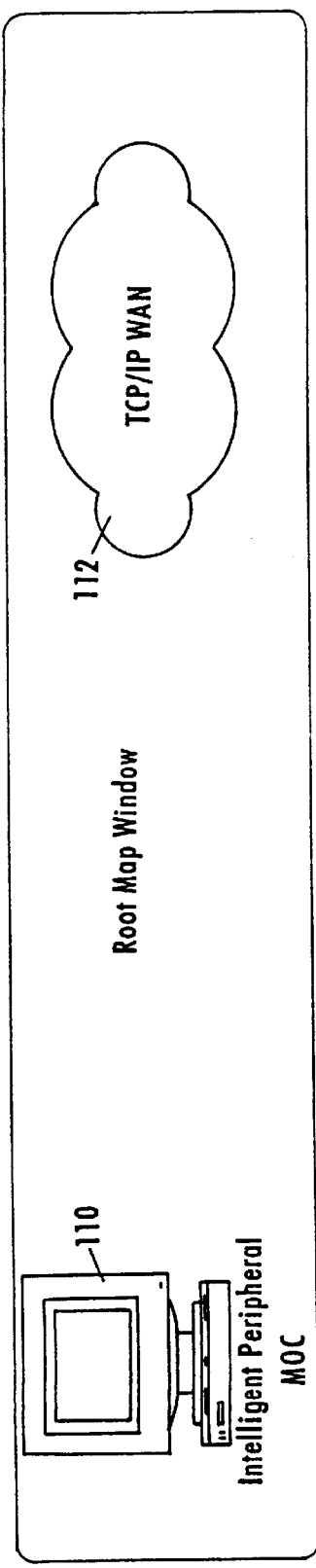
Figure 9B:
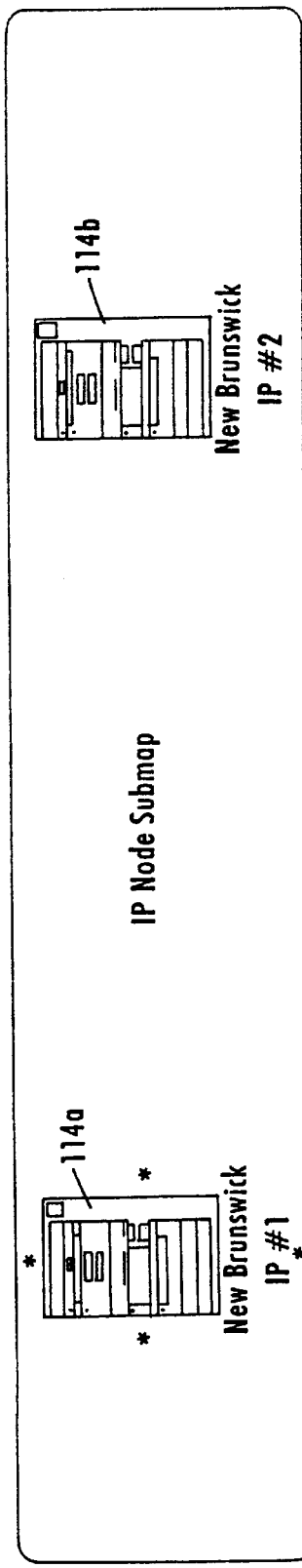

FIGS. 9A–9H are diagrams illustrating GUI displays of icons showing the error status and relative priority of the different systems as organized by the topology daemon 72. FIG. 9A illustrates a root map window for the MOC 32, whereby a user may select an icon 110 to monitor the status of all assigned IPs on the network, or may select an icon 112 to identify all the network elements on the wide area network 42 shown in FIG. 3. If the user selects the icon 110, the user is presented with a display as shown in FIG. 9B which includes icons 114a and 114b illustrating the status of two IPs 24. If the two IPs represented by icons 114a and 114b are operating normally, then the object mapping module 68 will assign an operational priority of "good", which the topology daemon will translate to the color green. Thus, if both IPs are operating normally, the icons 114a and 114b will be displayed as green icons. Similarly, the graphic user interface may use the following colors to identify status:

green—good or active (object is functioning normally)
 yellow—degraded (object within a device or object is functionally abnormally
 red—critical (very serious problem that requires immediate action)

Figure 9C:
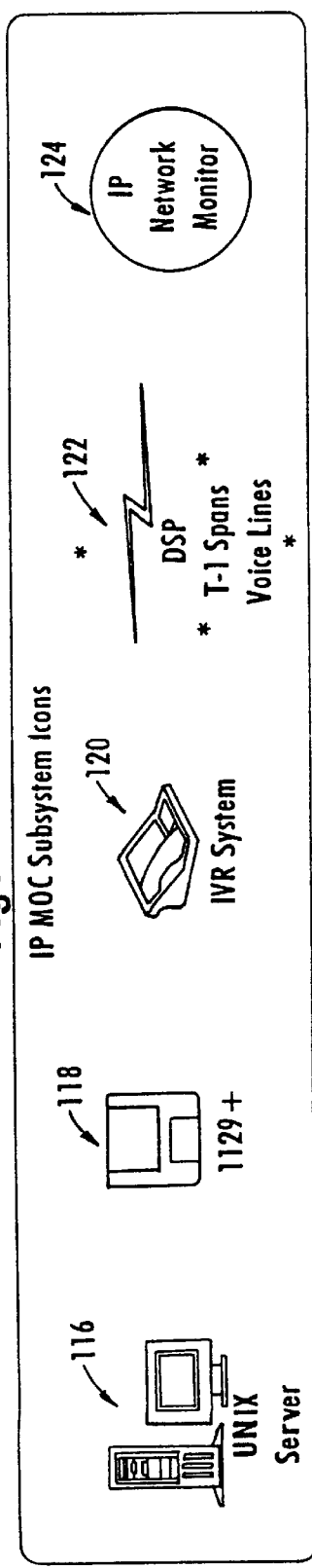
Figure 9D:
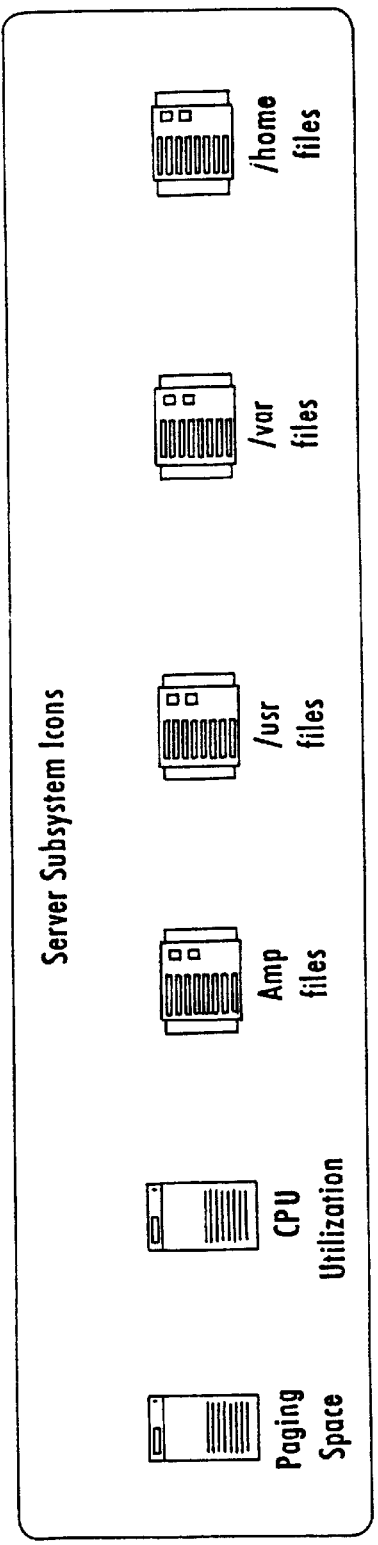
Figure 9E:
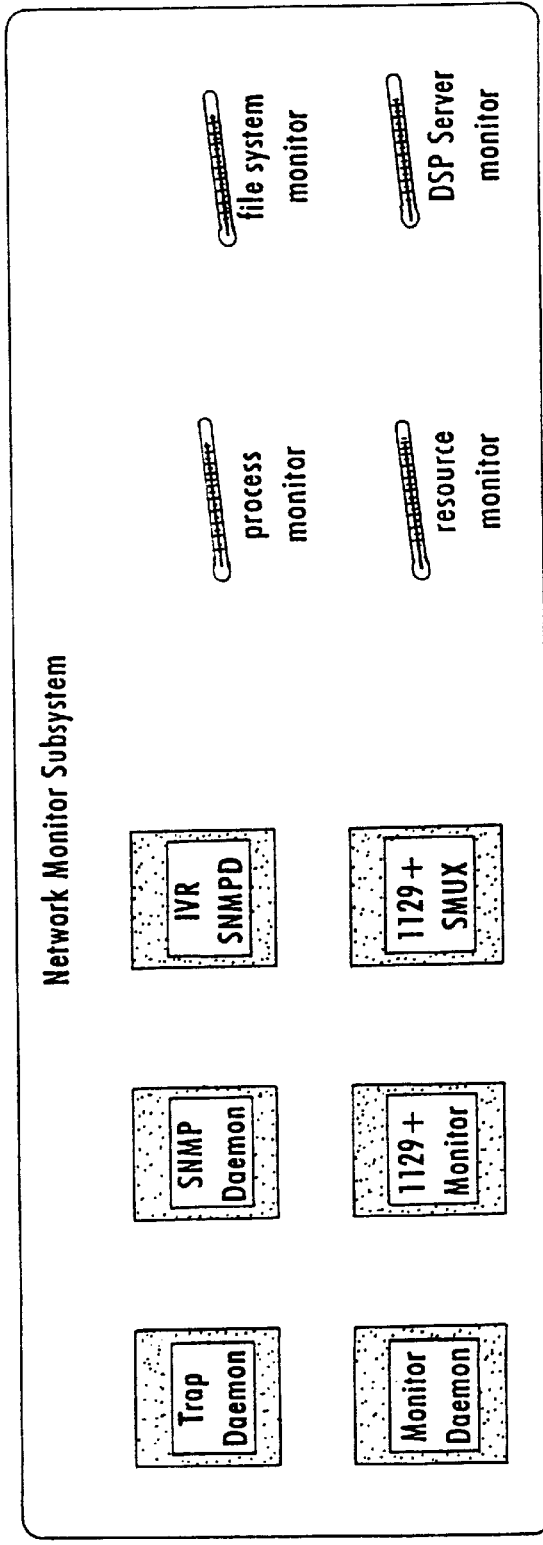
Figure 9F:
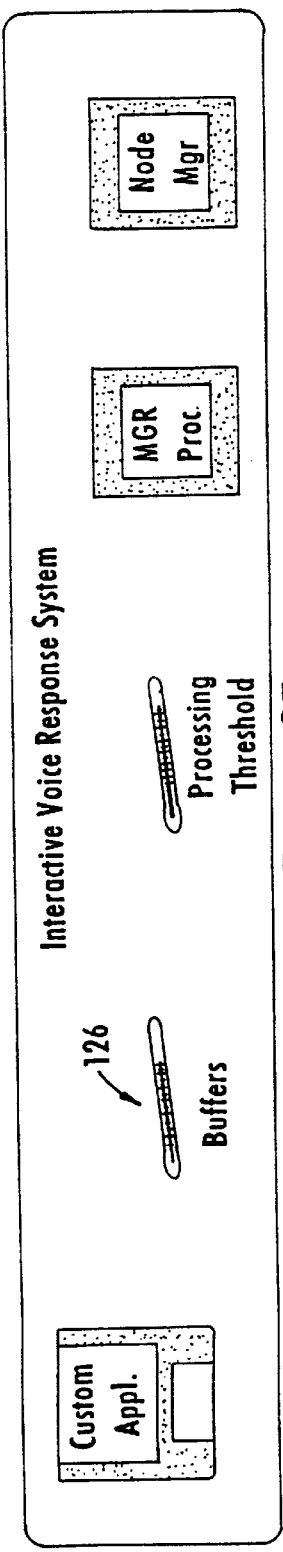

The topology daemon 72 organizes the operational priorities to provide different levels of detail for different topology layers. For example, at FIG. 9B, the icons will have a color of either green, yellow or red, although different layers may have orange-colored icons indicating major alarms with immediate action required. Assuming the icon 114 is red, the selection of the icon 114 will provide a display as shown in FIG. 9C, which displays by color the operational status of subsystems of the IP 24: icon 116 represents the UNIX server system; icon 118 represents the 1129+ network interface; icon 120 represents the interactive voice response (IVR) system; icon 122 represents the digital signal processing (DSP) equipment and T-1 communication lines; and icon 124 represents the monitoring subsystems within the IP 24. At the hierarchy level shown in FIG. 9C, at least one of the icons will have an operational status matching the status of the corresponding higher level in FIG. 9B. For example, if the icon 114a of FIG. 9B was red, at least one of the icons in FIG. 9C will be red, with other icons being either yellow or green. At this point, the user may select any of the icons of FIG. 9C to obtain a display for the lower level routines for each of the subsystems. For example, selection of the icon 116 provides the display of FIG. 9D, showing the subsystems of the UNIX server. Similarly, FIGS. 9E, 9F, 9G and 9H are displayed by selecting icons 124, 120, 122, and 118, respectively.

Figure 9G:
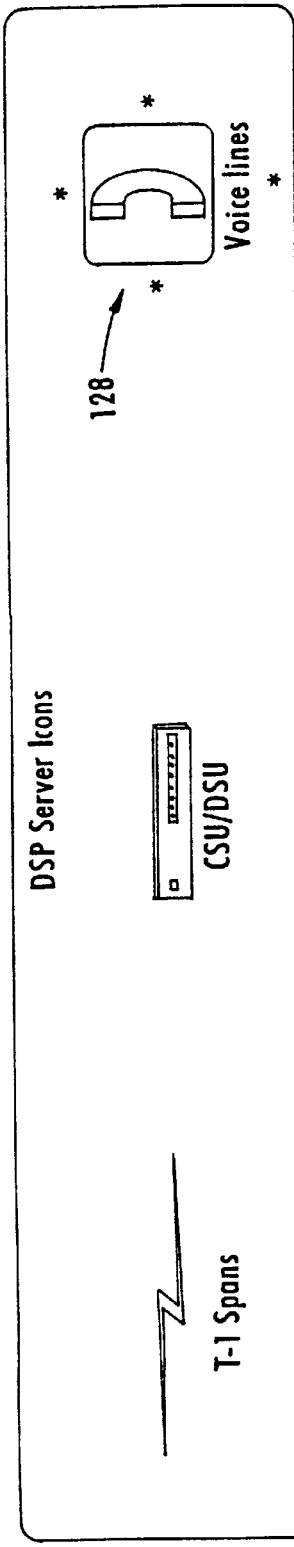
Figure 9H:
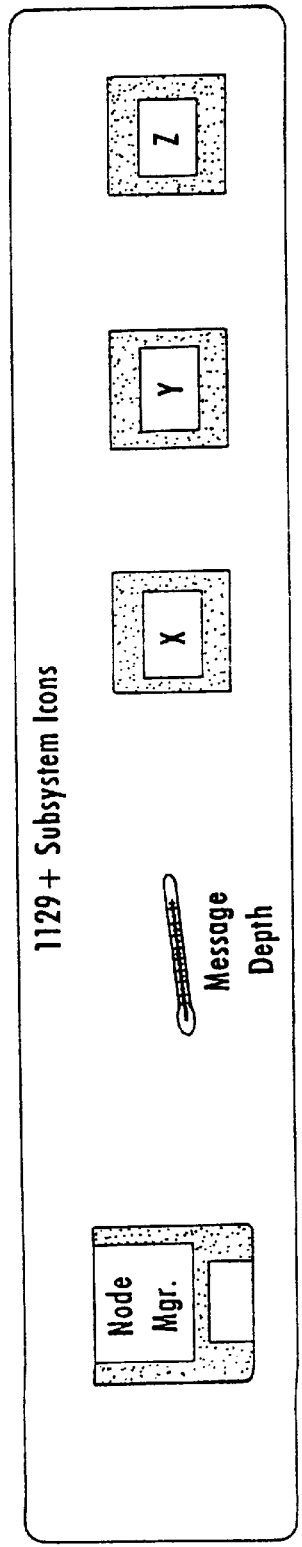

The topology daemon 72 organizes the objects so that an operational priority identifying the highest operational error is propagated from the lowest topology layer to the highest layer. For example, FIG. 9G illustrates an icon 128 that represents the operational status of voice transmission lines in the IP 24. If the icon 128 was red (shown in the drawings by an asterisk (*)), indicating a critical failure in the voice transmission line, the topology daemon 72 would set the corresponding icons so that the DSP icon 122 in FIG. 9C would also be red (*). Similarly, if the display in FIG. 9C was the operational subset of the icon 114a for IP #1, the icon 114a would also be red (*).

Thus, a user could easily determine the status of the different intelligent peripherals, as well as quickly identify the error by identifying in FIG. 9B the icon 114a as having a red color, indicating a critical status. If the user selects the icon 114a, the GUI provides the display in FIG. 9C, which displays the icon 122 as a red color, indicating a critical failure to be located in the telephone lines in the IP 24. If the user selects the icon 122, the GUI provides the display in FIG. 9G, showing the icon 128 as a red color, indicating that the critical failure has been identified as being located in the voice lines in the IP 24.

Figure 9I:
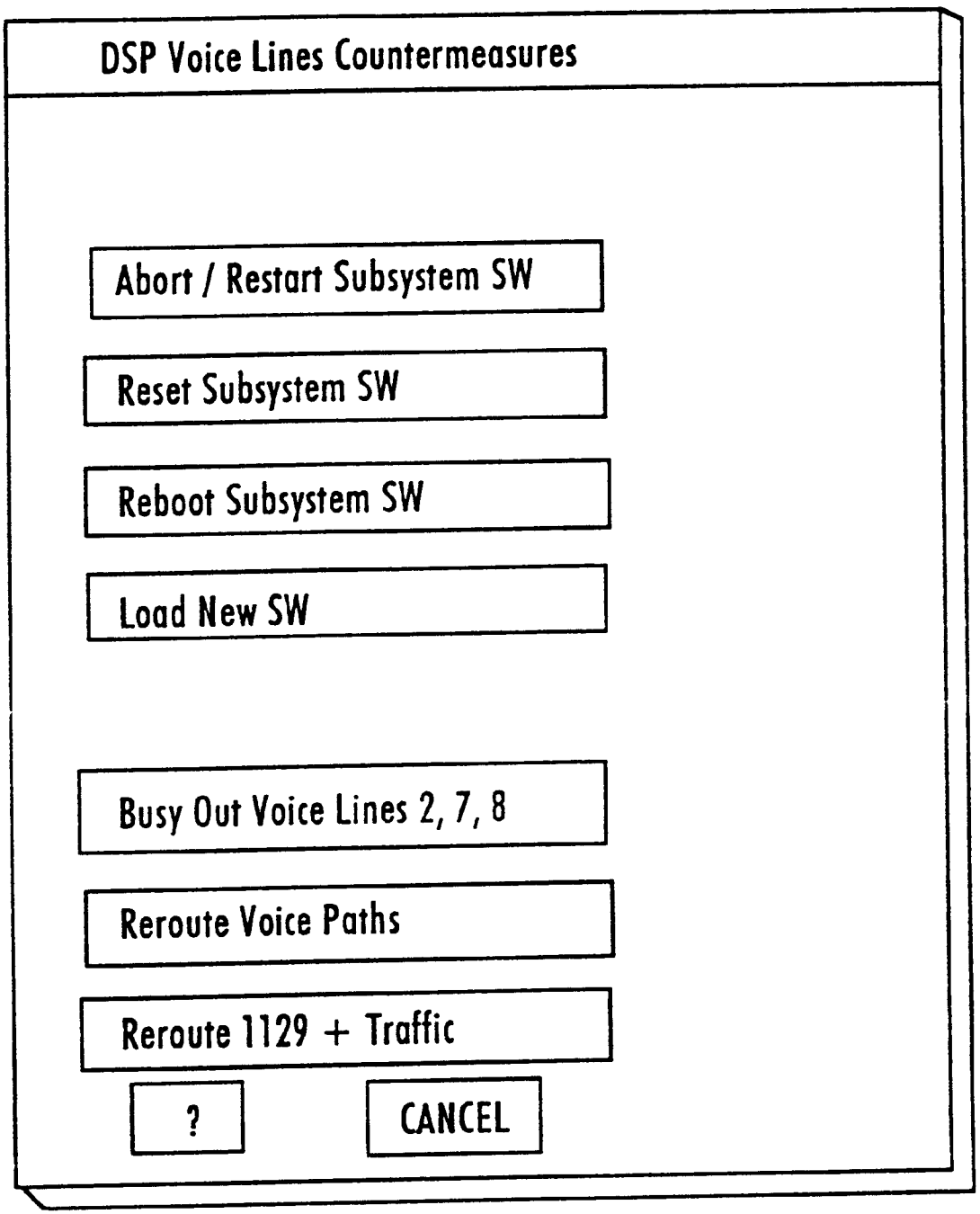

Once the critical failure has been identified, the user may take corrective action by selecting the icon displaying the critical failure. For example, if the user selects the icon 128 in FIG. 9G, the remote terminal 76 displaying the graphic user interface may present a display as shown in FIG. 9I offering alternative countermeasures to correct the failure. Alternatively, the corrective action module may automatically begin corrective countermeasures upon the selection of the icon 128, whereby the corrective action module 82 is able to identify what corrective action should be taken by accessing the MIB 70.

Thus, the topology daemon 72 organizes the objects for convenient graphical display. As another example, if the buffer systems in the interactive voice response system were to be overloaded in a specific IP, the topology daemon 72 would set the icon 126 in FIG. 9F to a yellow color. This error would be propagated upward through the topology layers by setting the IVR icon 120 in FIG. 9C to a yellow color, and setting the icon 144a in FIG. 9B to a yellow color if there is no higher operational priority. It will be appreciated that different GUI formats and arrangements may be used. For example, a single screen may be provided which provides an outstanding alarm summary as shown in FIG. 9J, whereby icons are arranged on the basis of critical failures. Alternatively, the status alarms may be arranged by group.

Referring to FIG. 9A, selection of the icon 112 will provide a display of all AIN elements on the wide area network. The topology daemon 72 shown in FIG. 7 accesses a discovery process module 106 that monitors the active elements on the network 42 on the basis of the IP network addresses. Thus, the MOC 32 is able to perform monitoring and control functions of any network device that is active on the network, and which is recognized by the MOC 32 on the basis of the corresponding AIN element objects. If an AIN element is not recognized by the MOC 32, the MOC 32 may send a request that the network element provide its MIB objects so that the MOC 32 may compile the objects in the MIB 70. Thus, the MOC 32 can easily adapt to additions or modifications to the AIN network.

According to the present invention, a maintenance operations console for an advanced intelligent network receives error status messages as MIB objects in a standardized management protocol, such as SNMP, from a packet switched network using a standardized transport protocol, such as TCP/IP. Thus, the present invention provides maximum flexibility for management of the advanced intelligent network, regardless of the physical location of the AIN elements.

Moreover, the maintenance operations console of the present invention can be easily modified to accommodate changes in the AIN network elements. For example, the disclosed IP 24 used a combination of vendor-supplied error detection systems with SNMP conversion systems, and SNMP agents to detect errors in the IP. It is anticipated that IPs will be provided that provide software monitoring subsystems that monitor all subsystems in SNMP-compliant format, eliminating the need for SNMP protocol conversion. Alternatively, the IP 24 may periodically receive different IVR or voice recognition applications providing enhanced or additional services. If the IP 24 receives a software upgrade of one of its subsystems, the MIB 70 of the MOC 32 would be updated to include new or updated MIB objects identifying the latest software revision, as well as any new or changed functions within the updated IP 24.

Similarly, if a new AIN element was added to the network, the MOC 32 could automatically begin monitoring operations of the new AIN element. For example, a new broadband IP may be implemented of the type disclosed in commonly-assigned, copending application No. 08/518,471, filed Aug. 21, 1995 entitled SPLIT INTELLIGENT PERIPHERAL FOR BROADBAND AND NARROW-BAND SERVICES (attorney docket 680-143), the disclosure of which is incorporated in its entirety by reference. In order to begin monitoring of the new AIN element by the MOC, the new AIN element at turn-on would send a cold-start trap identifying its presence on the SINET 30. The MOC 32, upon receiving the cold-start trap, would recognize the network element as an unidentified network element, and send a getnext protocol verb to the new AIN element in order to obtain all the necessary MIB objects related to the new AIN element.

Once the MOC 32 received all the MIB objects for the new AIN element, the MOC 32 could issue a query to the OSS 38 regarding the new AIN element. The OSS 38 would return a message specifying the assignment of the new AIN element, and possibly assignment information defining the assigned management responsibilities to be performed by the MOC 32. In the event that the MOC 32 is to share responsibilities with another MOC at a remote location, the two MOCs would exchange SNMP messages to provide distributed management processing functions.

Although the preferred embodiment has been disclosed as a maintenance and operations console that sends and receives SNMP messages on a packet switched network having TCP/IP transport protocol, it will be appreciated that any standardized network management message format and network transport protocol may be used to provide the flexible and adaptive management functions. For example, the SNMP objects may be replaced with objects conforming to the OSI Common Management Information Protocol/Common Management Information Service Element (CMIP/CMISE).

In addition, even though the GUI workstation was disclosed as a part of the maintenance operations console, any remote terminal having a data link to the data network 30 at a sufficient rate to provide a graphic user interface, such as ISDN, may be used.

Further, although the disclosed embodiment provided a packet switched signaling network (SINET) separate from the SS7 signaling network of FIGS. 1 and 2, it will be appreciated that switching systems, such as the SSP 10, may be controlled in response to correction commands from the MOC 32 by establishing a translation interface between the SSP and the SS7 signaling network. For example, the ISCP 22 may provide TCAP messages via the SS7 network in response to messages received via the SINET 30; similarly, a dedicated translation interface may be inserted to provide communications between the SS7 signaling network and the SINET 30.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. In an advanced intelligent network (AIN) comprising a plurality of AIN elements providing call processing functions in a public switched telephone network and a data network providing operations messages between the AIN elements, wherein each of said AIN elements includes an operating software subsystem, an application software subsystem performing a call processing function, a communication subsystem sending and receiving operations messages to and from said each AIN element via a standardized transport protocol, and a monitoring subsystem identifying errors in each of the subsystems of said each AIN element, a maintenance and operations console (MOC) coupled to said plurality of AIN elements via a data communication network for monitoring said plurality of AIN elements, said MOC comprising:

an alarm management module for receiving and organizing alarms from the plurality of AIN elements in response to the application subsystem of an AIN element sending an alarm and an operational priority of the alarm;

a topology map module for organizing the alarms received by said alarm module for display on a graphic user interface; and a failover/recovery system for performing corrective countermeasures by outputting correction commands to different AIN elements in response to detected alarms from the alarm management module.

2. The MOC of claim 1, wherein said failover/recovery system is further responsive to selected inputs from a user at the graphic user interface.

3. The MOC of claim 1, further comprising:

a simplified network management protocol (SNMP) network management application for executing the monitoring, detection, and correction of alarms in the AIN network.

4. The MOC of claim 3, further comprising:

an operating system server for supporting the functions of said alarm management module, said topology module, said failover/recovery system, and said network management application.

* * * * *